United States Patent
Aaltonen

(10) Patent No.: US 8,671,000 B2
(45) Date of Patent: Mar. 11, 2014

(54) METHOD AND ARRANGEMENT FOR PROVIDING CONTENT TO MULTIMEDIA DEVICES

(75) Inventor: Janne Aaltonen, Turku (FI)

(73) Assignee: Apple Inc., Cupertino, CA (US)

( * ) Notice: Subject to any disclaimer, the term of this patent is extended or adjusted under 35 U.S.C. 154(b) by 1092 days.

(21) Appl. No.: 12/148,157

(22) Filed: Apr. 17, 2008

(65) Prior Publication Data

US 2008/0270242 A1    Oct. 30, 2008

Related U.S. Application Data

(60) Provisional application No. 60/926,006, filed on Apr. 24, 2007.

(30) Foreign Application Priority Data

Jun. 6, 2007 (GB) .................................... 0710853.3

(51) Int. Cl.
*G06Q 40/00* (2012.01)
(52) U.S. Cl.
USPC ................................................ 705/4; 705/35
(58) Field of Classification Search
USPC .................. 705/50, 51, 53, 14.4, 14
See application file for complete search history.

(56) References Cited

U.S. PATENT DOCUMENTS

| | | | |
|---|---|---|---|
| 5,355,302 A | 10/1994 | Martin | |
| 5,375,235 A | 12/1994 | Berry et al. | |
| 5,408,519 A | 4/1995 | Pierce et al. | |
| 5,464,946 A | 11/1995 | Lewis | |
| 5,483,278 A | 1/1996 | Strubbe | |
| 5,583,763 A | 12/1996 | Atcheson et al. | |
| 5,613,213 A | 3/1997 | Naddell et al. | |
| 5,640,590 A | 6/1997 | Luther | |
| 5,697,844 A | 12/1997 | Von Kohorn | |
| 5,724,521 A | 3/1998 | Dedrick | |
| 5,754,939 A | 5/1998 | Herz | |
| 5,758,257 A | 5/1998 | Herz | |
| 5,765,144 A | 6/1998 | Larche | |
| 5,890,152 A | 3/1999 | Rapaport | |
| 5,892,451 A | 4/1999 | May | |

(Continued)

FOREIGN PATENT DOCUMENTS

| BE | 1015704 | 7/2005 |
|---|---|---|
| DE | 199 41 461 A1 | 3/2001 |

(Continued)

OTHER PUBLICATIONS

U.K. Search Report under Section 17 dated Oct. 3, 2007 in U.K. Application No. GB0710853.3.

(Continued)

*Primary Examiner* — Ojo O Oyebisi
(74) *Attorney, Agent, or Firm* — Novak Druce Connolly Bove + Quigg LLP

(57) ABSTRACT

Arrangement and method for providing content to multimedia devices, in particular mobile multimedia devices, wherein a content portal provides content to the devices in a form requiring a rights object to enable use thereof, a rights object portal provides rights objects to the devices and advertisements which are associated with the rights objects are also provided. Upon receipt of the rights object with an associated advertisement, the user is exposed to the advertisement in conjunction with use of the content.

42 Claims, 6 Drawing Sheets

(56) References Cited

U.S. PATENT DOCUMENTS

| | | |
|---|---|---|
| 5,918,014 A | 6/1999 | Robinson |
| 5,950,176 A | 9/1999 | Keiser |
| 5,978,775 A | 11/1999 | Chen |
| 5,978,833 A | 11/1999 | Pashley et al. |
| 6,000,044 A | 12/1999 | Chrysos et al. |
| 6,009,458 A | 12/1999 | Hawkins |
| 6,023,700 A | 2/2000 | Owens et al. |
| 6,038,591 A | 3/2000 | Wolfe |
| 6,043,818 A | 3/2000 | Nakano |
| 6,047,311 A | 4/2000 | Ueno et al. |
| 6,097,942 A | 8/2000 | Laiho |
| 6,112,186 A | 8/2000 | Bergh et al. |
| 6,134,532 A | 10/2000 | Lazarus et al. |
| 6,205,432 B1 | 3/2001 | Gabbard |
| 6,222,925 B1 | 4/2001 | Shiels |
| 6,269,361 B1 | 7/2001 | Davis et al. |
| 6,334,145 B1 | 12/2001 | Adams et al. |
| 6,338,044 B1 | 1/2002 | Cook et al. |
| 6,345,279 B1 | 2/2002 | Li et al. |
| 6,345,288 B1 | 2/2002 | Reed et al. |
| 6,346,951 B1 | 2/2002 | Mastronardi |
| 6,347,313 B1 | 2/2002 | Ma |
| 6,349,339 B1 | 2/2002 | Williams |
| 6,381,465 B1 | 4/2002 | Chern et al. |
| 6,381,575 B1 | 4/2002 | Martin et al. |
| 6,389,278 B1 | 5/2002 | Singh |
| 6,405,243 B1 | 6/2002 | Nielsen |
| 6,408,309 B1 | 6/2002 | Agarwal |
| 6,430,539 B1 | 8/2002 | Lazarus et al. |
| 6,434,621 B1 | 8/2002 | Pezzillo |
| 6,438,557 B1 | 8/2002 | Dent |
| 6,438,579 B1 | 8/2002 | Hosken |
| 6,487,539 B1 | 11/2002 | Aggarwal et al. |
| 6,516,416 B2 | 2/2003 | Gregg |
| 6,526,411 B1 | 2/2003 | Ward |
| 6,532,469 B1 | 3/2003 | Feldman et al. |
| 6,577,716 B1 | 6/2003 | Minter |
| 6,587,127 B1 | 7/2003 | Leeke et al. |
| 6,596,405 B2 | 7/2003 | Zampini et al. |
| 6,615,208 B1 | 9/2003 | Behrens et al. |
| 6,628,247 B2 | 9/2003 | Toffolo |
| 6,633,318 B1 | 10/2003 | Kim |
| 6,646,657 B1 | 11/2003 | Rouser |
| 6,647,371 B2 | 11/2003 | Shinohara |
| 6,684,249 B1 | 1/2004 | Frerichs et al. |
| 6,687,696 B2 | 2/2004 | Hofmann et al. |
| 6,690,918 B2 | 2/2004 | Evans et al. |
| 6,704,576 B1 | 3/2004 | Brachman et al. |
| 6,718,551 B1 | 4/2004 | Swix et al. |
| 6,748,395 B1 | 6/2004 | Picker et al. |
| 6,751,574 B2 | 6/2004 | Shinohara |
| 6,785,688 B2 | 8/2004 | Abajian et al. |
| 6,816,724 B1 | 11/2004 | Asikainen |
| 6,826,572 B2 | 11/2004 | Colace |
| 6,842,761 B2 | 1/2005 | Diamond et al. |
| 6,850,252 B1 | 2/2005 | Hoffberg |
| 6,914,891 B2 | 7/2005 | Ha et al. |
| 6,920,326 B2 | 7/2005 | Agarwal et al. |
| 6,931,454 B2 | 8/2005 | Deshpande et al. |
| 6,933,433 B1 | 8/2005 | Porteus |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | O'Rourke et al. |
| 6,993,532 B1 | 1/2006 | Platt et al. |
| 7,013,238 B1 | 3/2006 | Weare |
| 7,020,637 B2 | 3/2006 | Bratton |
| 7,021,836 B2 | 4/2006 | Anderson |
| 7,035,812 B2 | 4/2006 | Meisel |
| 7,051,352 B1 | 5/2006 | Schaffer |
| 7,058,696 B1 | 6/2006 | Phillips et al. |
| 7,072,846 B1 | 7/2006 | Robinson |
| 7,072,947 B1 | 7/2006 | Knox et al. |
| 7,082,407 B1 | 7/2006 | Bezos et al. |
| 7,096,234 B2 | 8/2006 | Plastina |
| 7,111,240 B2 | 9/2006 | Crow |
| 7,113,917 B2 | 9/2006 | Jacobi |
| 7,113,999 B2 | 9/2006 | Pestoni et al. |
| 7,120,619 B2 | 10/2006 | Drucker |
| 7,127,143 B2 | 10/2006 | Elkins, II et al. |
| 7,136,866 B2 | 11/2006 | Springer, Jr. |
| 7,136,903 B1 | 11/2006 | Phillips et al. |
| 7,139,723 B2 | 11/2006 | Conkwright |
| 7,149,537 B1 | 12/2006 | Kupsh et al. |
| 7,174,126 B2 | 2/2007 | McElhatten |
| 7,174,309 B2 | 2/2007 | Niwa |
| 7,180,473 B2 | 2/2007 | Horie |
| 7,181,415 B2 | 2/2007 | Blaser et al. |
| 7,188,085 B2 * | 3/2007 | Pelletier .......................... 705/50 |
| 7,194,421 B2 | 3/2007 | Conkwright |
| 7,197,472 B2 | 3/2007 | Conkwright |
| 7,222,105 B1 | 5/2007 | Romansky |
| 7,224,282 B2 | 5/2007 | Terauchi et al. |
| 7,225,342 B2 | 5/2007 | Takao |
| 7,236,941 B2 | 6/2007 | Conkwright |
| 7,246,041 B2 | 7/2007 | Fukuda |
| 7,256,341 B2 | 8/2007 | Plastina |
| 7,277,870 B2 | 10/2007 | Mourad et al. |
| 7,296,158 B2 | 11/2007 | Staddon |
| 7,302,419 B2 | 11/2007 | Conkwright |
| 7,302,468 B2 | 11/2007 | Wijeratne |
| 7,328,343 B2 | 2/2008 | Caronni |
| 7,358,434 B2 | 4/2008 | Plastina |
| 7,360,084 B1 | 4/2008 | Hardjono |
| 7,363,314 B2 | 4/2008 | Picker et al. |
| 7,383,329 B2 | 6/2008 | Erickson |
| 7,383,586 B2 | 6/2008 | Cross |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz et al. |
| 7,455,590 B2 | 11/2008 | Hansen |
| 7,457,862 B2 | 11/2008 | Hepworth et al. |
| 7,457,946 B2 | 11/2008 | Hind |
| 7,478,323 B2 | 1/2009 | Dowdy |
| 7,490,775 B2 | 2/2009 | Biderman |
| 7,492,371 B2 | 2/2009 | Jeffrey |
| 7,493,572 B2 | 2/2009 | Card et al. |
| 7,499,630 B2 | 3/2009 | Koch et al. |
| 7,505,959 B2 | 3/2009 | Kaiser et al. |
| 7,546,254 B2 | 6/2009 | Bednarek |
| 7,558,559 B2 | 7/2009 | Alston |
| 7,568,213 B2 | 7/2009 | Carhart et al. |
| 7,571,121 B2 | 8/2009 | Bezos |
| 7,571,183 B2 | 8/2009 | Renshaw et al. |
| 7,574,422 B2 | 8/2009 | Guan et al. |
| 7,574,513 B2 | 8/2009 | Dunning et al. |
| 7,580,932 B2 | 8/2009 | Plastina et al. |
| 7,581,101 B2 | 8/2009 | Ahtisaari |
| 7,599,847 B2 | 10/2009 | Block |
| 7,599,906 B2 | 10/2009 | Kashiwagi |
| 7,599,950 B2 | 10/2009 | Walther et al. |
| 7,644,077 B2 | 1/2010 | Picker et al. |
| 7,647,613 B2 | 1/2010 | Darkoulis |
| 7,657,224 B2 | 2/2010 | Goldberg et al. |
| 7,657,493 B2 | 2/2010 | Meijer et al. |
| 7,680,849 B2 | 3/2010 | Heller et al. |
| 7,680,959 B2 | 3/2010 | Svendsen |
| 7,685,204 B2 | 3/2010 | Rogers |
| 7,690,026 B2 | 3/2010 | Zhu |
| 7,693,887 B2 | 4/2010 | McLaughlin |
| 7,707,603 B2 | 4/2010 | Abanami |
| 7,720,871 B2 | 5/2010 | Rogers et al. |
| 7,725,494 B2 | 5/2010 | Rogers et al. |
| 7,734,569 B2 | 6/2010 | Martin |
| 7,739,723 B2 | 6/2010 | Rogers |
| 7,747,620 B2 | 6/2010 | Beaupre |
| 7,801,896 B2 | 9/2010 | Szabo |
| 7,818,350 B2 | 10/2010 | New |
| 7,826,444 B2 | 11/2010 | Irvin |
| 7,831,199 B2 | 11/2010 | Ng |
| 7,840,570 B2 | 11/2010 | Cervera et al. |
| 7,844,498 B2 | 11/2010 | Robbin |

(56) References Cited

U.S. PATENT DOCUMENTS

| | | |
|---|---|---|
| 7,853,712 B2 | 12/2010 | Amidon et al. |
| 7,875,788 B2 | 1/2011 | Benyamin |
| 7,882,543 B2 | 2/2011 | Mousseau |
| 7,889,274 B2 | 2/2011 | Fujie et al. |
| 8,346,709 B2 | 1/2013 | Silverman et al. |
| 2001/0007099 A1 | 7/2001 | Rau |
| 2001/0021914 A1 | 9/2001 | Jacobi et al. |
| 2001/0042017 A1 | 11/2001 | Matsukawa |
| 2001/0047272 A1 | 11/2001 | Frietas et al. |
| 2001/0051925 A1 | 12/2001 | Kang |
| 2001/0056434 A1 | 12/2001 | Kaplan et al. |
| 2002/0002510 A1 | 1/2002 | Sharp |
| 2002/0002899 A1 | 1/2002 | Gjerdingen |
| 2002/0004413 A1 | 1/2002 | Inoue |
| 2002/0004743 A1 | 1/2002 | Kutaragi et al. |
| 2002/0006803 A1 | 1/2002 | Mendiola et al. |
| 2002/0016736 A1 | 2/2002 | Cannon et al. |
| 2002/0019829 A1 | 2/2002 | Shapiro |
| 2002/0042912 A1 | 4/2002 | Iijima et al. |
| 2002/0052754 A1 | 5/2002 | Joyce |
| 2002/0059094 A1 | 5/2002 | Hosea et al. |
| 2002/0059379 A1 | 5/2002 | Harvey |
| 2002/0061743 A1 | 5/2002 | Hutcheson |
| 2002/0073210 A1 | 6/2002 | Low et al. |
| 2002/0075305 A1 | 6/2002 | Beaton et al. |
| 2002/0077130 A1 | 6/2002 | Owensby |
| 2002/0078006 A1 | 6/2002 | Shteyn |
| 2002/0082901 A1 | 6/2002 | Dunning et al. |
| 2002/0082923 A1 | 6/2002 | Merriman et al. |
| 2002/0083411 A1 | 6/2002 | Bouthors et al. |
| 2002/0095330 A1 | 7/2002 | Berkowitz |
| 2002/0111177 A1 | 8/2002 | Castres |
| 2002/0128029 A1 | 9/2002 | Nishikawa |
| 2002/0137507 A1 | 9/2002 | Winkler |
| 2002/0138291 A1 | 9/2002 | Vaidyanathan et al. |
| 2002/0141403 A1 | 10/2002 | Akahane |
| 2002/0152117 A1 | 10/2002 | Cristofalo et al. |
| 2002/0164962 A1 | 11/2002 | Mankins |
| 2002/0174430 A1 | 11/2002 | Ellis |
| 2002/0178223 A1 | 11/2002 | Bushkin |
| 2002/0178276 A1 | 11/2002 | McCartney et al. |
| 2002/0183045 A1 | 12/2002 | Emmerson |
| 2002/0194215 A1 | 12/2002 | Cantrell et al. |
| 2003/0003929 A1 | 1/2003 | Himmel et al. |
| 2003/0003935 A1 | 1/2003 | Vesikivi et al. |
| 2003/0018797 A1 | 1/2003 | Dunning et al. |
| 2003/0033321 A1 | 2/2003 | Schrempp et al. |
| 2003/0037068 A1 | 2/2003 | Thomas |
| 2003/0040297 A1 | 2/2003 | Pecen et al. |
| 2003/0040300 A1 | 2/2003 | Bodic et al. |
| 2003/0055689 A1 | 3/2003 | Block |
| 2003/0064757 A1 | 4/2003 | Yamadera et al. |
| 2003/0083108 A1 | 5/2003 | King |
| 2003/0097379 A1 | 5/2003 | Ireton |
| 2003/0101126 A1 | 5/2003 | Cheung |
| 2003/0120630 A1 | 6/2003 | Tunkelang |
| 2003/0126015 A1 | 7/2003 | Chan et al. |
| 2003/0130887 A1 | 7/2003 | Nathaniel |
| 2003/0144022 A1 | 7/2003 | Hatch |
| 2003/0154300 A1 | 8/2003 | Mostafa |
| 2003/0163369 A1 | 8/2003 | Arr |
| 2003/0182567 A1 | 9/2003 | Barton et al. |
| 2003/0185356 A1 | 10/2003 | Katz |
| 2003/0188017 A1 | 10/2003 | Nomura |
| 2003/0191689 A1 | 10/2003 | Bosarge et al. |
| 2003/0195039 A1 | 10/2003 | Orr |
| 2003/0197719 A1 | 10/2003 | Lincke et al. |
| 2003/0203731 A1 | 10/2003 | King |
| 2003/0212710 A1 | 11/2003 | Guy |
| 2003/0220866 A1 | 11/2003 | Pisaris-Henderson |
| 2003/0229537 A1 | 12/2003 | Dunning et al. |
| 2004/0002993 A1 | 1/2004 | Toussaint et al. |
| 2004/0003392 A1 | 1/2004 | Trajkovic et al. |
| 2004/0003398 A1 | 1/2004 | Donian et al. |
| 2004/0032393 A1 | 2/2004 | Brandenberg |
| 2004/0032434 A1 | 2/2004 | Pinsky et al. |
| 2004/0043777 A1 | 3/2004 | Brouwer et al. |
| 2004/0043790 A1 | 3/2004 | Ben-David |
| 2004/0045029 A1 | 3/2004 | Matsuura |
| 2004/0045030 A1 | 3/2004 | Reynolds |
| 2004/0054576 A1 | 3/2004 | Kanerva et al. |
| 2004/0063449 A1 | 4/2004 | Fostick |
| 2004/0068460 A1 | 4/2004 | Feeley |
| 2004/0068552 A1 | 4/2004 | Kotz et al. |
| 2004/0073924 A1 | 4/2004 | Pendakur |
| 2004/0092248 A1 | 5/2004 | Kelkar |
| 2004/0093289 A1 | 5/2004 | Bodin |
| 2004/0128286 A1 | 7/2004 | Yasushi et al. |
| 2004/0136358 A1 | 7/2004 | Hind et al. |
| 2004/0137987 A1 | 7/2004 | Nguyen |
| 2004/0139064 A1 | 7/2004 | Chevallier et al. |
| 2004/0143667 A1 | 7/2004 | Jerome |
| 2004/0148424 A1 | 7/2004 | Berkson et al. |
| 2004/0152518 A1 | 8/2004 | Kugo |
| 2004/0158860 A1 | 8/2004 | Crow |
| 2004/0162738 A1 | 8/2004 | Sanders et al. |
| 2004/0185883 A1 | 9/2004 | Rukman |
| 2004/0186789 A1 | 9/2004 | Nakashima |
| 2004/0192359 A1 | 9/2004 | McRaild et al. |
| 2004/0194128 A1 | 9/2004 | McIntyre |
| 2004/0198403 A1 | 10/2004 | Pedersen |
| 2004/0203761 A1 | 10/2004 | Baba et al. |
| 2004/0203851 A1 | 10/2004 | Vetro et al. |
| 2004/0204133 A1 | 10/2004 | Andrew et al. |
| 2004/0204145 A1 | 10/2004 | Nagatomo |
| 2004/0209649 A1 | 10/2004 | Lord |
| 2004/0215793 A1 | 10/2004 | Ryan |
| 2004/0233224 A1 | 11/2004 | Ohba |
| 2004/0240649 A1 | 12/2004 | Goel |
| 2004/0240861 A1 | 12/2004 | Yeend |
| 2004/0259526 A1 | 12/2004 | Goris et al. |
| 2004/0267715 A1 | 12/2004 | Polson et al. |
| 2005/0010641 A1 | 1/2005 | Staack |
| 2005/0018853 A1 | 1/2005 | Lain et al. |
| 2005/0021395 A1 | 1/2005 | Luu |
| 2005/0021470 A1 | 1/2005 | Martin et al. |
| 2005/0033700 A1 | 2/2005 | Vogler et al. |
| 2005/0050208 A1 | 3/2005 | Chatani |
| 2005/0060350 A1 | 3/2005 | Baum et al. |
| 2005/0060425 A1 | 3/2005 | Yeh et al. |
| 2005/0075908 A1 | 4/2005 | Stevens |
| 2005/0086105 A1 | 4/2005 | McFadden et al. |
| 2005/0086697 A1 | 4/2005 | Haseltine |
| 2005/0091146 A1 | 4/2005 | Levinson |
| 2005/0091381 A1 | 4/2005 | Sunder |
| 2005/0102610 A1 | 5/2005 | Jie |
| 2005/0114357 A1 | 5/2005 | Chengalvarayan et al. |
| 2005/0119936 A1 | 6/2005 | Buchanan et al. |
| 2005/0125397 A1 | 6/2005 | Gross et al. |
| 2005/0131752 A1 | 6/2005 | Gracie |
| 2005/0138369 A1 | 6/2005 | Lebovitz |
| 2005/0141709 A1 | 6/2005 | Bratton |
| 2005/0154608 A1 | 7/2005 | Paulson et al. |
| 2005/0160458 A1 | 7/2005 | Baumgartner |
| 2005/0193014 A1 | 9/2005 | Prince |
| 2005/0193054 A1 | 9/2005 | Wilson et al. |
| 2005/0195696 A1 | 9/2005 | Rekimoto |
| 2005/0203807 A1 | 9/2005 | Bezos et al. |
| 2005/0210009 A1 | 9/2005 | Tran |
| 2005/0210101 A1 | 9/2005 | Janik |
| 2005/0216341 A1 | 9/2005 | Agarwal |
| 2005/0216859 A1 | 9/2005 | Paek et al. |
| 2005/0222989 A1 | 10/2005 | Haveliwala et al. |
| 2005/0223039 A1 | 10/2005 | Kim et al. |
| 2005/0228680 A1 | 10/2005 | Malik |
| 2005/0234891 A1 | 10/2005 | Walther et al. |
| 2005/0235811 A1 | 10/2005 | Dukane |
| 2005/0239504 A1 | 10/2005 | Ishii et al. |
| 2005/0249216 A1 | 11/2005 | Jones |
| 2005/0251440 A1 | 11/2005 | Bednarek |
| 2005/0256867 A1 | 11/2005 | Walther et al. |
| 2005/0273465 A1 | 12/2005 | Kimura |
| 2005/0276570 A1 | 12/2005 | Reed et al. |
| 2005/0289113 A1 | 12/2005 | Bookstaff |

(56) References Cited

U.S. PATENT DOCUMENTS

| | | |
|---|---|---|
| 2006/0015904 A1 | 1/2006 | Marcus |
| 2006/0018208 A1 | 1/2006 | Nathan et al. |
| 2006/0018209 A1 | 1/2006 | Drakoulis et al. |
| 2006/0020062 A1 | 1/2006 | Bloom |
| 2006/0020662 A1 | 1/2006 | Robinson |
| 2006/0026263 A1 | 2/2006 | Raghavan et al. |
| 2006/0031164 A1 | 2/2006 | Kim |
| 2006/0031327 A1 | 2/2006 | Kredo |
| 2006/0037039 A1 | 2/2006 | Aaltonen |
| 2006/0048059 A1 | 3/2006 | Etkin |
| 2006/0059044 A1 | 3/2006 | Chan |
| 2006/0059495 A1 | 3/2006 | Spector |
| 2006/0062094 A1 | 3/2006 | Nathan et al. |
| 2006/0067296 A1 | 3/2006 | Bershad |
| 2006/0068845 A1 | 3/2006 | Muller et al. |
| 2006/0074750 A1 | 4/2006 | Clark et al. |
| 2006/0075019 A1 | 4/2006 | Donovan et al. |
| 2006/0075425 A1 | 4/2006 | Koch et al. |
| 2006/0080251 A1 | 4/2006 | Fried |
| 2006/0080356 A1 | 4/2006 | Burges et al. |
| 2006/0091203 A1 | 5/2006 | Bakker et al. |
| 2006/0095511 A1 | 5/2006 | Munarriz et al. |
| 2006/0095516 A1 | 5/2006 | Wijeratne |
| 2006/0100978 A1 | 5/2006 | Heller |
| 2006/0106936 A1 | 5/2006 | De Luca |
| 2006/0112098 A1 | 5/2006 | Renshaw et al. |
| 2006/0117378 A1 | 6/2006 | Tam et al. |
| 2006/0123014 A1 | 6/2006 | Ng |
| 2006/0123052 A1 | 6/2006 | Robbin et al. |
| 2006/0129455 A1 | 6/2006 | Shah |
| 2006/0135232 A1 | 6/2006 | Willis |
| 2006/0136344 A1 | 6/2006 | Jones et al. |
| 2006/0141923 A1 | 6/2006 | Goss |
| 2006/0143236 A1 | 6/2006 | Wu |
| 2006/0155732 A1 | 7/2006 | Momose |
| 2006/0165571 A1 | 7/2006 | Seon et al. |
| 2006/0168616 A1 | 7/2006 | Candelore |
| 2006/0173910 A1 | 8/2006 | McLaughlin |
| 2006/0173916 A1 | 8/2006 | Verbeck Sibley et al. |
| 2006/0174008 A1 | 8/2006 | Abanami |
| 2006/0194595 A1 | 8/2006 | Myllynen et al. |
| 2006/0195462 A1 | 8/2006 | Rogers |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers |
| 2006/0195790 A1 | 8/2006 | Beaupre |
| 2006/0200460 A1 | 9/2006 | Meyerzon et al. |
| 2006/0200461 A1 | 9/2006 | Lucas et al. |
| 2006/0204601 A1 | 9/2006 | Palu |
| 2006/0206586 A1 | 9/2006 | Ling et al. |
| 2006/0229941 A1 | 10/2006 | Gupta |
| 2006/0242129 A1 | 10/2006 | Libes |
| 2006/0253874 A1 | 11/2006 | Stark et al. |
| 2006/0265421 A1 | 11/2006 | Ranasinghe et al. |
| 2006/0276170 A1 | 12/2006 | Radhakrishnan et al. |
| 2006/0276213 A1 | 12/2006 | Gottschalk et al. |
| 2006/0277098 A1 | 12/2006 | Chung et al. |
| 2006/0282311 A1 | 12/2006 | Jiang |
| 2006/0282328 A1 | 12/2006 | Gerace et al. |
| 2006/0286963 A1 | 12/2006 | Koskinen et al. |
| 2006/0286964 A1 | 12/2006 | Polanski et al. |
| 2006/0288044 A1 | 12/2006 | Kashiwagi et al. |
| 2006/0288124 A1 | 12/2006 | Kraft et al. |
| 2006/0288367 A1 | 12/2006 | Swix et al. |
| 2007/0003064 A1 | 1/2007 | Wiseman |
| 2007/0004333 A1 | 1/2007 | Kavanti |
| 2007/0016507 A1 | 1/2007 | Tzara |
| 2007/0043829 A1 | 2/2007 | Dua |
| 2007/0047523 A1 | 3/2007 | Jiang |
| 2007/0055439 A1 | 3/2007 | Denker |
| 2007/0055440 A1 | 3/2007 | Denker |
| 2007/0061568 A1 | 3/2007 | Lee |
| 2007/0072631 A1 | 3/2007 | Mock et al. |
| 2007/0073596 A1 | 3/2007 | Alexander et al. |
| 2007/0074262 A1 | 3/2007 | Kikkoji et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0100690 A1 | 5/2007 | Hopkins |
| 2007/0100805 A1 | 5/2007 | Ramer et al. |
| 2007/0101373 A1 | 5/2007 | Bodlanender et al. |
| 2007/0105536 A1 | 5/2007 | Tingo, Jr. |
| 2007/0106899 A1 | 5/2007 | Suzuki |
| 2007/0113243 A1 | 5/2007 | Brey |
| 2007/0117571 A1 | 5/2007 | Musial |
| 2007/0118546 A1 | 5/2007 | Acharya |
| 2007/0136264 A1 | 6/2007 | Tran |
| 2007/0149208 A1 | 6/2007 | Syrbe et al. |
| 2007/0156677 A1 | 7/2007 | Szabo |
| 2007/0157247 A1 | 7/2007 | Cordray et al. |
| 2007/0161402 A1 | 7/2007 | Ng |
| 2007/0202922 A1 | 8/2007 | Myllynen |
| 2007/0203790 A1 | 8/2007 | Torrens et al. |
| 2007/0204061 A1 | 8/2007 | Chen |
| 2007/0239527 A1 | 10/2007 | Nazer et al. |
| 2007/0244880 A1 | 10/2007 | Martin et al. |
| 2007/0250429 A1 | 10/2007 | Walser |
| 2007/0250761 A1 | 10/2007 | Bradley et al. |
| 2007/0255614 A1 | 11/2007 | Ourednik et al. |
| 2007/0271286 A1 | 11/2007 | Purang |
| 2007/0290787 A1 | 12/2007 | Fiatal et al. |
| 2007/0294096 A1 | 12/2007 | Randall |
| 2008/0004046 A1 | 1/2008 | Mumick et al. |
| 2008/0004948 A1 | 1/2008 | Flake |
| 2008/0004990 A1 | 1/2008 | Flake |
| 2008/0013537 A1 | 1/2008 | Dewey et al. |
| 2008/0027881 A1 | 1/2008 | Bisse |
| 2008/0032703 A1 | 2/2008 | Krumm et al. |
| 2008/0032717 A1 | 2/2008 | Sawada et al. |
| 2008/0046317 A1 | 2/2008 | Christianson |
| 2008/0057917 A1 | 3/2008 | Oria |
| 2008/0070579 A1 | 3/2008 | Kankar et al. |
| 2008/0071875 A1 | 3/2008 | Koff et al. |
| 2008/0077264 A1 | 3/2008 | Irvin et al. |
| 2008/0082467 A1 | 4/2008 | Meijer et al. |
| 2008/0082686 A1 | 4/2008 | Schmidt et al. |
| 2008/0097922 A1* | 4/2008 | Davydov et al. .................. 705/54 |
| 2008/0109378 A1 | 5/2008 | Papadimitriou |
| 2008/0123856 A1 | 5/2008 | Won et al. |
| 2008/0130547 A1 | 6/2008 | Won |
| 2008/0132215 A1 | 6/2008 | Soderstrom |
| 2008/0133601 A1 | 6/2008 | Cervera et al. |
| 2008/0155057 A1 | 6/2008 | Khedouri et al. |
| 2008/0155588 A1 | 6/2008 | Roberts et al. |
| 2008/0195438 A1 | 8/2008 | Manfredi |
| 2008/0195468 A1 | 8/2008 | Malik |
| 2008/0220855 A1 | 9/2008 | Chen et al. |
| 2008/0243619 A1 | 10/2008 | Sharman et al. |
| 2008/0270221 A1 | 10/2008 | Clemens et al. |
| 2008/0294523 A1 | 11/2008 | Little |
| 2008/0301303 A1 | 12/2008 | Matsuoka |
| 2009/0024504 A1 | 1/2009 | Lerman et al. |
| 2009/0024510 A1 | 1/2009 | Chen et al. |
| 2009/0048957 A1 | 2/2009 | Celano |
| 2009/0073174 A1 | 3/2009 | Berg et al. |
| 2009/0076939 A1 | 3/2009 | Berg et al. |
| 2009/0076974 A1 | 3/2009 | Berg et al. |
| 2009/0083307 A1 | 3/2009 | Cervera et al. |
| 2009/0089222 A1 | 4/2009 | Ferreira De Castro et al. |
| 2009/0106085 A1 | 4/2009 | Raimbeault |
| 2009/0210415 A1 | 8/2009 | Martin et al. |
| 2009/0275315 A1 | 11/2009 | Alston |
| 2009/0276368 A1 | 11/2009 | Martin et al. |
| 2010/0161595 A1 | 6/2010 | Martin et al. |
| 2010/0169328 A1 | 7/2010 | Hangartner |
| 2011/0022475 A1 | 1/2011 | Inbar et al. |
| 2011/0258039 A1 | 10/2011 | Patwa et al. |

(56) References Cited

U.S. PATENT DOCUMENTS

| | | | |
|---|---|---|---|
| 2011/0258049 A1 | 10/2011 | Ramer et al. | |
| 2011/0282739 A1 | 11/2011 | Mashinsky et al. | |

FOREIGN PATENT DOCUMENTS

| | | |
|---|---|---|
| DE | 10061984 | 6/2002 |
| EP | 0 831 629 A2 | 3/1998 |
| EP | 1050833 | 8/2000 |
| EP | 1 043 905 A2 | 10/2000 |
| EP | 1073293 | 1/2001 |
| EP | 1083504 | 3/2001 |
| EP | 1 107 137 A2 | 6/2001 |
| EP | 1 109 371 A2 | 6/2001 |
| EP | 1 195 701 A1 | 4/2002 |
| EP | 1220132 | 7/2002 |
| EP | 1231788 | 8/2002 |
| EP | 1239392 | 9/2002 |
| EP | 1280087 | 1/2003 |
| EP | 1320214 | 6/2003 |
| EP | 1365604 | 11/2003 |
| EP | 1408705 | 4/2004 |
| EP | 1420388 | 5/2004 |
| EP | 1455511 | 9/2004 |
| EP | 1528827 | 5/2005 |
| EP | 1542482 | 6/2005 |
| EP | 1548741 | 6/2005 |
| EP | 1587332 | 10/2005 |
| EP | 1615455 | 1/2006 |
| EP | 1 633 100 A1 | 3/2006 |
| EP | 1677475 | 7/2006 |
| EP | 1772822 | 4/2007 |
| GB | 2 386 509 A | 0/1720 |
| GB | 2369218 | 5/2002 |
| GB | 2372867 | 9/2002 |
| GB | 2380364 | 4/2003 |
| GB | 2406996 | 4/2005 |
| GB | 2 414 621 A | 11/2005 |
| GB | 2 416 887 A | 2/2006 |
| GB | 2 424 546 A | 9/2006 |
| JP | 11-052965 | 2/1999 |
| JP | 2002-108351 | 4/2002 |
| JP | 2002-140272 | 5/2002 |
| JP | 2002-320203 | 10/2002 |
| JP | 2003-255958 | 9/2003 |
| JP | 2004-221999 | 8/2004 |
| JP | 2005-027337 | 1/2005 |
| JP | 2007-087138 | 4/2007 |
| JP | 2007-199821 | 8/2007 |
| KR | 2002025579 | 4/2002 |
| KR | 2003-0049440 | 6/2003 |
| KR | 2006-139233 A | 2/2006 |
| WO | WO 89/10610 | 11/1989 |
| WO | 96/24213 | 8/1996 |
| WO | 00/44151 | 7/2000 |
| WO | WO 00/70848 | 11/2000 |
| WO | WO 01/22748 A1 | 3/2001 |
| WO | WO 01/31497 A1 | 5/2001 |
| WO | 01/44977 | 6/2001 |
| WO | 01/50703 | 7/2001 |
| WO | 01/52161 | 7/2001 |
| WO | 01/58178 | 8/2001 |
| WO | 01/63423 | 8/2001 |
| WO | WO 01/57705 A1 | 8/2001 |
| WO | 01/69406 | 9/2001 |
| WO | 01/72063 | 9/2001 |
| WO | WO 01/65411 A1 | 9/2001 |
| WO | WO 01/71949 A1 | 9/2001 |
| WO | 01/91400 | 11/2001 |
| WO | 01/93551 | 12/2001 |
| WO | 01/97539 | 12/2001 |
| WO | WO 02/09431 A2 | 1/2002 |
| WO | 02/23489 | 3/2002 |
| WO | 02/31624 | 4/2002 |
| WO | WO 02/35324 A2 | 5/2002 |
| WO | 02/44989 | 6/2002 |
| WO | WO 02/50632 A2 | 6/2002 |
| WO | 02/054803 | 7/2002 |
| WO | 02/069651 | 9/2002 |
| WO | 02/075574 | 9/2002 |
| WO | WO 02/069585 A2 | 9/2002 |
| WO | 02/084895 | 10/2002 |
| WO | WO 02/086664 A2 | 10/2002 |
| WO | 02/091238 | 11/2002 |
| WO | 02/096056 | 11/2002 |
| WO | WO 02/100121 | 12/2002 |
| WO | WO 03/015430 A1 | 2/2003 |
| WO | 03/019845 | 3/2003 |
| WO | 03/024136 | 3/2003 |
| WO | WO 03/019913 A1 | 3/2003 |
| WO | WO 03/024136 A1 | 3/2003 |
| WO | 03/036541 | 5/2003 |
| WO | 03/049461 | 6/2003 |
| WO | 03/051051 | 6/2003 |
| WO | 03/088690 | 10/2003 |
| WO | WO 2004/057578 A1 | 7/2004 |
| WO | 2004/070538 | 8/2004 |
| WO | 2004/084532 | 9/2004 |
| WO | 2004/086791 | 10/2004 |
| WO | WO 2004/093044 A1 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | 2005/013114 | 2/2005 |
| WO | WO 2005/020578 A1 | 3/2005 |
| WO | WO 2005/029769 A1 | 3/2005 |
| WO | 2005/073863 | 8/2005 |
| WO | 2005/076650 | 8/2005 |
| WO | 2005/115107 | 12/2005 |
| WO | 2006/002869 | 1/2006 |
| WO | 2006/005001 | 1/2006 |
| WO | 2006/016189 | 2/2006 |
| WO | 2006/024003 | 3/2006 |
| WO | 2006/027407 | 3/2006 |
| WO | 2006/040749 | 4/2006 |
| WO | 2006/052837 | 5/2006 |
| WO | 2006/075032 | 7/2006 |
| WO | 2006/093284 | 9/2006 |
| WO | 2006/104895 | 10/2006 |
| WO | 2006/114451 | 11/2006 |
| WO | WO 2006/119481 A2 | 11/2006 |
| WO | 2007/002025 | 1/2007 |
| WO | WO 2007/001118 A1 | 1/2007 |
| WO | 2007/038806 | 4/2007 |
| WO | 2007/060451 | 5/2007 |
| WO | 2007/075622 | 7/2007 |
| WO | 2007/091089 | 8/2007 |
| WO | 2007/092053 | 8/2007 |
| WO | 2007/134193 | 11/2007 |
| WO | 2008/013437 | 1/2008 |
| WO | WO 2008/024852 A | 2/2008 |
| WO | 2008/045867 | 4/2008 |
| WO | 2008/147919 | 12/2008 |
| WO | 2009/088554 | 7/2009 |
| WO | 2009/149046 | 12/2009 |

OTHER PUBLICATIONS

U.K. Further Search Report under Section 17 dated Dec. 5, 2007 in U.K. Application No. GB0710853.3.
U.K. Combined Search and Examination Report under Sections 17 and 18(3) dated May 13, 2008 in U.K. Application No. GB0802177.6.
International Search Report and Written Opinion of the International Searching Authority dated Nov. 11, 2008 issued in corresponding International Application PCT/EP200B/054911.
"DRM Architecture Approved Version 2.0," OMA-AD-DRM-V2_0-20060303-A (Open Mobile Alliance, Ltd.), Mar. 3, 2006.
"Digital Rights Management in the Mobile Environment," Y. Raivio & S. Luukkainen, Proceedings of the International Conference on E-Business and Telecommunication, ICETE 2006, Aug. 7, 2006.

(56) References Cited

OTHER PUBLICATIONS

"New Model for Sharing: Free Music With ADS," Robert Levine, The New York Times (Online Edition), Apr. 23, 2007.
PCT International Preliminary Report on Patentability Issued by the International Bureau of WIPO, Dated Oct. 27, 2009 (1 page).
PCT Written Opinion Issued by the International Searching Authority dated Oct. 27, 2009 (6 pages).
European Search Report dated Nov. 11, 2008 issued in related European Patent Application No. 08153258.2.
"Baugher et al", The Secure Real-Time Transport Protocol (SRTP), Mar. 2004, Network Working Group Request for Comments:3711, p. 1-53.
"Communication Pursuant to Article 94(3) EPC dated Feb. 10, 2009", European Patent Office in related European Patent Application No. 07 118 601.9 (3 pages), Feb. 10, 2009.
"Communication Pursuant to Article 94(3) EPC issued Jun. 25, 2009", European Patent Application No. 08 159 331.1 (3 pages), Jun. 25, 2009.
"English translation of First Office Action issued by State Intellectual Property Office of the People's Republic of China", Chinese Application No. 200480033236.X (8 pages), Dec. 4, 2009.
"English Translation of First Office Action issued by the Chinese Patent Office", Chinese Application No. 200480019404.X, Aug. 19, 2008.
"European Examination Report dated Nov. 3, 2008", European Patent Application No. EP 08159331.1, Nov. 3, 2008.
"European Examination Report dated Nov. 3, 2008", European Patent Application No. EP 08159333.7, Nov. 3, 2008.
"European Search Report Nov. 5, 2008", European Patent Application No. EP 08159331.1, Nov. 5, 2008.
"European Search Report Aug. 1, 2008 issued by European Patent Office", EPO Application No. EP 08153651.8, Aug. 1, 2008.
"European Search Report dated Nov. 5, 2008", European Patent Application No. EP 08159333.7, Nov. 5, 2008.
"European Search Report dated Apr. 7, 2010", European Patent Application No. EP 10153358.6 (6 pages).
"European Search Report dated Jul. 18, 2008", European Patent Office in related EPO Application No. EP 08 15 3656, Jul. 18, 2008.
"European Search Report Dated Jul. 18, 2008", European Patent Office in related EPO Application No. EP 08 15 3658, Jul. 18, 2008.
"European Search Report dated Jul. 22, 2008", European Patent Office in related EPO Application No. EP 08153651.8, Jul. 22, 2008.
"European Search Report dated Jul. 23, 2008", European Patent Office in related EPO Application No. EP 08153654.2, Jul. 23, 2008.
"European Search Report dated Apr. 18, 2008", European Patent Application No. 08101188.4, Apr. 18, 2008.
"European Search Report dated Mar. 19, 2008", European Patent Office in counterpart European Application No. EP 07 11 8601, Mar. 19, 2008.
"European Search Report dated Nov. 5, 2008", European Patent Application No. EP 08159331.1, Nov. 5, 2008.
"Extended European Search Report dated Dec. 2, 2008", European Patent Office in counterpart EPO Application No. EP 07120620.5, Dec. 2, 2008.
"Extended European Search Report dated Dec. 29, 2008", European Patent Office in counterpart EPO Application No. EP 07120480.4, Dec. 29, 2008.
"Ghassan Chaddoud et al.", Dynamic Group Communication Security, pp. 49-56, IEEE 2001.
"International Search Report and Written Opinion of the International Search Authority", International Patent Application No. PCT/EP2008/051229, May 8, 2008.
"International Search Report for International Application", PCT/FI2006/050467, dated Jul. 25, 2007.
"International Search Report in PCT Application No. PCT/GB2004/003890", Apr. 5, 2005.
"Office Action (Notice of Allowance)", USPTO dated Jun. 11, 2009 in U.S. Appl. No. 12/079,312 (5 pages).
"Office Action dated Jan. 28, 2009 in U.S. Appl. No. 10/571,709", filed Jan. 28, 2009, (29 pages).
"Office Action dated Apr. 6, 2009 in related U.S. Appl. No. 12/156,335 (17 pages)", filed Apr. 6, 2009.
"Office Action dated Jun. 21, 2010", U.S. Appl. No. 10/555,543 (17 pages), filed Jun. 21, 2010.
"Office Action dated Apr. 6, 2009", U.S. Appl. No. 10/555,543 (14 pages), filed Apr. 6, 2009.
"Office Action dated Feb. 5, 2009", U.S. Appl. No. 12/079,312 (12 pages), filed Feb. 5, 2009.
"Office Action dated Mar. 9, 2001", Issued in related U.S. Appl. No. 12/477,766 (27 pages).
"Office Action from British Intellectual Property Office", British Application No. GB0712281.5 (5 pages), Oct. 9, 2008.
"Office Action issued Apr. 22, 2010", U.S. Appl. No. 12/156,335 (16 pages), Apr. 22, 2010.
"Office Action issued by USPTO dated Nov. 20, 2009", U.S. Appl. No. 10/571,709 (20 pages), Oct. 20, 2009.
"Office Action issued by USPTO dated Mar. 22, 2010", U.S. Appl. No. 12/431,961 (19 pages), Mar. 22, 2010.
"Office Action issued from the USPTO dated Nov. 4, 2010", U.S. Appl. No. 12/431,961 (21 pages), Nov. 4, 2010.
"Office Action issued from the USPTO dated Aug. 14, 2009", U.S. Appl. No. 12/431,961 (12 pages), Aug. 14, 2009.
"Office Action issued from the USPTO dated Sep. 28, 2009", U.S. Appl. No. 12/156,335 (26 pages), Sep. 28, 2009.
"Office Action issued from USPTO", in related U.S. Appl. No. 10/555,543 (19 pages), Oct. 20, 2009.
"Office Action Issued from USPTO dated Oct. 5, 2009", U.S. Appl. No. 10/571,709 (26 pages), Oct. 5, 2009.
"Office Action Issued Jan. 12, 2011 by the USPTO", U.S. Appl. No. 12/484,454 (10 pages).
"Office Action Issued Mar. 29, 2011 by the USPTO", U.S. Appl. No. 10/555,543 (17 pages), Mar. 29, 2011.
"Office Action Mar. 24, 2009", U.S. Appl. No. 12/156,335, Mar. 24, 2009.
"Official Action from the European Patent Office dated Apr. 1, 2009",.European Application No. 08 717 428.0 (4 pages), Apr. 01, 2009.
"PCT International Search Report (Form PCT/ISA/210)", International Application PCT/EP2008/052678 (3 pages), Jul. 4, 2008.
"PCT International Search Report issued by PCT International Searching.Authority", International Searching Authority in connection with the related PCT International Application No. PCT/NL2004/000335 (27 pages), Sep. 24, 2004.
"Schulzrinne et al, "RTP: A Transport Protocol for Real-Time.Applications"", Network Working Group Request for Comments: 3550, p. 1-98, Jul. 1, 2003.
"Search Report under Section 17 dated May 20, 2008", issued by the British Patent Office in UK Application No. GB0807153.2, May 20, 2008.
"Text of Second Office Action (English Translation)", Jun. 12, 2009 in corresponding Chinese Patent Application No. 200480019404.X (2 pages).
"U.K. Patent Office Examination Report under Section 18(3)", U.K Application No. GB0315984.5, Mar. 29, 2006.
"U.K. Search Report under Section 17 dated Mar. 3, 2005", U.K Application Serial No. GB0420339.4, Mar. 3, 2005.
"United Kingdom Search Report under Section 17", GB 0712281.5 (2 pages), Oct. 24, 2007.
"Wallner et al., "Key Management for Multicast: Issues and Architectures"", National Security Agency Network Working Group Request for Comments: 2627, p. 1-22, Jun. 1, 1999.
Industry Standard, The, Help FAQs for Standard Prediction Market, http://www.thestandard.com/help, downloaded Jun. 29, 2009.
www.akoo.com/Akoo/, Web Page, Akoo, Pick the Music, Waiting in the line at the Theme Park, Introducing the m-Venue™ platform.
www.ecastinc.com/music_licensing.html, Web Page, ECAST Network, interactive entertainment network, Music/ Licensing.
www.roweinternational.com/jukeboxes_dia.html, Web Page, Digital Internet Access Jukeboxes, Rowe International.
www.touchtunes.com, Web Page, Touchtunes, Turn your ROWE 100A's and 100B's into touch tunes Digital Jukeboxes—Bose.
IEEE, no matched results, Nov. 11, 2009, 1 page.

(56) References Cited

OTHER PUBLICATIONS

Stolowitz Ford Cowger LLPC, List of Related Cases, May 20, 2010.
Extended European Search Report and Search Report Opinion dated Aug. 5, 2010 for EP 06720209.
PCT/US2006/048330; International Bureau; PCT Search Report and Written Opinion; Mar. 20, 2008; 10 pages.
"Communications of the ACM" Dec. 1992, vol. 35, No. 12 at pp. 26-28 (Introduction to special issue regarding Workshop on High Performance Information Filtering, Morristown, N.J. Nov. 1991)., Dec. 26-28, 1992.
Apple: iTunes 4.2 User Guide for Windows; Dec. 2003; retrieved from the internet: URL:http://www2.austin.cc.tx. us/tcm/projects/itunes.pdf; pp. 10, 17-19. (Added Ref Nov. 5, 2009), Dec. 2003.
"Architecting Personalized Delivery of Multimedia Information", Communications of the ACM (Dec. 1992).
"Digital Music Sales Triple to $1.1 Billion in 2005", Maintenance Fees, Feb. 24, 2006, Axcessnews.com,, available online www.axcessnews.com/modules/wfsection/article.php?articleid=8327, last viewed Feb. 24, 2006.
"Lessons from LyricTimeTM: A Prototype Multimedia System", 4th IEEE ComSoc International Workshop on Multimedia Communications (Apr. 1992).
"New Music Recommendation System is Based on FOAF Personal Profiling", www.masternewmedia.org/music_recommendation/music_recommendation_system_FOAF, Oct. 1, 2005.
"Not Your Average Jukebox", www.alwayson-network.com/comments.php?id=P12663 0 37 0 C, Web Page, Not Your Average Jukebox, On Hollywood 1000 contender Ecast uses broadbank to being the digital media experience to your watering hole. Posted Nov. 4, 2005.
"PCT International Preliminary Report on Patentability (Ch II) dated May 22, 2007", PCT Application No. PCT/ES2005/00003, May 22, 2007.
"PCT International Search Report and Written Opinion dated Dec. 7, 2007", PCT Application No. PCT/US2007/068708, Dec. 7, 2007, (6 pages).
"PCT International Search Report and Written Opinion dated Feb. 17, 2010", PCT Application No. PCT/US09/068604, Feb. 17, 2010.
"PCT International Search Report and Written Opinion dated May 28, 2008", PCT Application No. PCT/US2006/003795, May 28, 2008.
"PCT International Search Report and Written Opinion dated Jun. 5, 2009", PCT Application No. PCT/US09/42002, Jun. 5, 2009.
"PCT International Search Report and Written Opinion dated Jul. 15, 2009", PCT Application No. PCT/US2009/45911, Jul. 15, 2009.
"PCT International Search Report dated Oct. 23, 2009", PCT Application No. PCT/US2006/004257, Oct. 23, 2009.
"PCT International Search Report dated Feb. 9, 2007", PCT Application No. PCT/US2006/034218, Feb. 9, 2007, (3 pages).
"PCT International Search Report dated Mar. 25, 2008", PCT Application No. PCT/US2006/38769, Mar. 25, 2008, (3 pages).
"PCT International Search Report dated Jul. 15, 2009", PCT Application No. PCT/US2009/45725, Jul. 15, 2009.
"PCT International Search Report Dated Sep. 4, 2009", PCT Application No. PCT/US2009/051233, Sep. 4, 2009.
"PCT Written Opinion of the International Preliminary Examining Authority dated Mar. 19, 2007", PCT Application No. PCT/ES2005/00003, Mar. 19, 2007.
"PCT Written Opinion of the International Searching Authority dated Jan. 12, 2006", PCT Application No. PCT/ES2005/000213, Jan. 12, 2006.
"PCT Written Opinion of the International Searching Authority Report dated Jun. 10, 2005", PCT Application No. PCT/ES2005/00003, Jun. 10, 2005.
"RFID Brings Messages to Seattle Sidewalks", www.rfidjournal.comfarticle/articleview/1619/1/1, Web Page, RFID brings messages to Seattle side walks on RFID system being deployed next week will send marketing and assistive information to users carrying active RFID tags. RFID Journal (pp. 1-4)., May 26, 2004, 1-4.
"Social Networking Meets Music Listening: Mecora Launches Radio 2.0," www.masternewmedia.org/news/2006/04/13/social_networking_meets_music_listening.htm, Apr. 13, 2006.
"TouchTunes Signs License Agreement for BMI Music in Digital Jukeboxes", www.bmi.com/news/200403/20040324b.asp, Web Page, BMI™ Figures Don't Lie, Mar. 24, 2004, Touch Tunes Signs License Agreement for BMI Music in Digital Jukeboxes.
"Treemap", Treemap, University of Maryland, http://www.cs.umd.edu/hcil/treemap/, last udpated Aug. 5, 2003, 4 pages.
"Variations 2", The Trustees of Indiana University, Variations 2, The Indiana University Digital Music Library, http://dml.indiana.edu/, last updated May 11,2005, 1 page.
Alvear, Jose , ""Risk-Free Trial Streaming Media Delivery Tools,"", Alvear, Jose, "Risk-Free Trial Streaming Media Delivery Tools," Streaming Media.com; www.streamingmedia.com/ article.ap?id=5768, Jun. 30, 2000.
Aucouturier J et al: "Scaling up music playlist generation", Multimedia and Expo, 2002. ICME '02. Proceedings. 2002 IEEE Internatio Nal Conference on Lausanne, Switzerland Aug. 26-29, 2002, Piscataway, NJ, USA,IEEE, US, vol. 1, Aug. 26, 2002 , pp. 105, 105-108.
Baluja, S et al., "Video Suggestion and Discovery for YouTube: Taking Random Walks through the View Graph", Baluja, S., Seth, R., Sivakumar, D., Jing, Y., Yagnik, J., Kumar, S., Ravichandran, D., and Aly, M. "Video Suggestion and Discovery for YouTube: Taking Random Walks Through the View Graph". In WWW '08: Proceedings of the 17th International conference o, 2008, 895-904.
Belkins, et al., ""Information Filtering and.Information Retrieval: Two Sides of the Same Coin?"", Communications of the ACM (Dec. 1992).
Bender, ""Twenty Years of Personalization: All about the Daily Me,"" Educause Review (Sep./Oct. 2002).
Bender, et al., "Newspace: Mass Media and Personal Computing," Proceedings of USENIX, Conference, pp. 329-348(Summer 1991)., 329-348.
Bollen, Johan et al., "Toward alternative metrics of.journal impact: a comparison of download and citation data", Johan Bollen, Herbert Van de Sompel, Joan Smith, Rick Luce, Google.com, 2005, pp. 1-2.
Bunzel, Tom , "Easy Digital Music", Tom Bunzel, "Easy Digital Music," QUE Publisher, Aug. 18, 2004, Chapters 5 and 8.
Cano, Pedro et al., "On the Use of FastMap for Audio Retrieval and Browsing", The International Conference on Music Information Retrieval and Related Activities (ISMIR 2002), Paris, France, Oct. 2002,2 pages.
Carlson et al. "Internet Banking.Market Developments and Regulatory Issues in the New Econorny: What Changed, and the Challenges for Economic Policy . . . "; May 2001;http://www.occ.gov/netbank/SGEC2000.pdf.
Chao-Ming, Design and Evaluation and mProducer: a Mobile Authoring Tool for Personal Experience Computing [online], MUM 2004, College Park, Maryland, USA, Oct. 27-29, 2004 [retrieved on Dec. 17, 2010]. [http://citeseerx.ist.psu.edu/vie, [http://citeseerx.ist.psu.edu/viewdoc/download?doi=10.1.1.131.2933&rep.=rep1&type=pdf], Oct. 27-29, 2004.
Connell, Lain et al., "Ontological Sketch Models: Highlighting User-System Misfits", In P. Palanque, E. O'Neill and P. Johnson, editors, Proceedings of Human Computer Interaction (HCI) Bath, England, London Springer, pp. 1-16., Sep. 1-16, 2003.
Das, A et al., "Google News Personalization: Scalable Online Collaborative Filtering", Das,A., Datar,M., Garg,A., and Rajaram,S. "Google News Personalization: Scalable Online Collaborative Filtering". In WWW '07: Proceedings of the 16th international conference on World Wide Web, pp. 271-280, New York, NY, D USA, 2007. ACM Press., 2007, 271-280.
Dean, J et al., "MapReduce: Simplied Data Processing on Large Clusters". Commun. ACM, 51(1):107-113, 2008.
Dempster, Y , "Maximum Likelihood from Incomplete Data via the EM Algorithm", Dempster, Y., Laird, N., and Rubin, D. Jour. of the Royal Stat Soc., Ser. B., 39:1047-1053,1977.
Deshpande, Mukund et al., "Item-Based Top-N Recommendation Algorithms," ACM Transactions on Information Systems, 22:1 (Jan. 2004), pp. 143-177.

(56) References Cited

OTHER PUBLICATIONS

Hofmann, T. "Latent Semantic Models for Collaborative Filtering". ACM Transactions on Information Systems, 22:89-115,2004.
Hofmann, T. "Unsupervised Learning by Probabilistic Latent Semantic Analysis". Mach. Learn., 42:177-196, 2001.
Indyk, P. et al. and Matousek, J. "Low-Distortion Embeddings of Finite Metric Spaces". In Handbook of Discrete and Computational Geometry, pp. 177-196. CRC Press, 2004.
Jacucci, Giulio et al., "IP City, Integrated Project on Interaction and Presence on Urban Environments-Demonstrators on Large-Scale Events Applications"; ipcity.eu; Giulio Jacucci, John Evans, Tommi Ilmonen; pp. 1-37; Feb. 9, 2007.
Lazar, N A. , "Bayesian Empirical Likelihood", Technical Report, Carnegie Mellon University, Department of Statistics, 2000; 26 pages.
Lie, , "The Electronic Broadsheet—All the News That Fits the Display", MIT Master's Thesis, pp. 1-96 (Jun. 1991).
Lippman, et al., "News and Movies in the 50 Megabit Living Room,", IEEE/IEICE, Global Telecommunications Conference, pp. 1976-1981 (Nov. 15,1987).
Loeb, Shoshana , "Delivering Interactive Multimedia Documents over Networks", IEEE Communications Magazine; May 1992; 8 pages.
Logan, Beth et al., "A Music Similarity Function Based on Signal Analysis", IEEE International Conference on Multimedia and Expo (ICME), Tokyo, Japan, Aug. 2001, IEEE Press, pp. 952-955.
Logan, Beth , "Content-Based Playlist Generation: Exploratory Experiments", Logan, Beth, The International Conference on Music Information Retrieval and Related Activities (ISMIR 2002), Paris, France, Oct. 2002,2 pages.
Maidin, Donncha et al., "The Best of Two Worlds: Retrieving and Browsing", Proceedings of the COST G-6 Conference on Digital Audio Effects (DAFX-OO), Verona, Italy, Dec. 7-9, 2000,4 pages.
McCarthy, et al., "Augmenting the Social Space of an Academic Conference", Information School, University of Washington and Department of Computer Science and Engineering, University of Minnesota; pp. 1-10; Nov. 6-10.
Notess, Mark et al., Variations2: Toward Visual Interface for Digital Music Libraries, Second International Workshop on Visual Interfaces to Digital Libraries, 2002, 6 pages.
O'Connor, M et al., "PolyLens: A Recommender System for Groups of Users", PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218.
Orwant, J , "Appraising the User of User Models: Doppelganger's Interface", In: A. Kobsa and D. Litman (eds.), Proceeding.Of the 4th International Conference on User Modeling (1994).
Orwant, Jonathon L. , "Doppelganger Goes to School: Machine Learning for User Modeling", MIT Master of Science Thesis (Sep. 1993).
Orwant, Jonathon L. , "Doppelganger: A User Modeling System", MIT Bachelor's Thesis (Jun. 1991).
Pachet, Francois et al., "A Taxonomy of Musical Genres, Content-Based Multimedia Information Access Conference (RIAO)", Paris, Apr. 2000, 8 pages., Apr. 2000.
Paek, Tim et al., Toward University Mobile Interaction for Shared Displays; Microsoft Research, Redmond, WA; pp. 1-4; Nov. 6-10, 2004. Retrieved from the internet: <URL: http://research.microsoft.com/-timpaekiPapers/cscw2004. pdf> entire document., Nov. 2004, 1-4.

Pampalk, Elias et al., Content-based Organization and Visualization of Music Archives, ACM Multimedia, Juan les Pins, France, Dec. 2002, pp. 570-579.
Pauws, Steffen et al., "PATS: Realization and User Evaluation of an Automatic Playlist Generator", Pauws, Steffen et al., The International Conferences on Music Information Retrieval and Related Activities (ISMIR 2002), Paris, France, Oct. 2002,9 pages
Platt, John C. et al., "Learning a Gaussian Process Prior for Automatically Generating Music Playlists," Microsoft Corporation {platt, cburgess, sswenson, chriswea}@microsoft.com, alcez@cs.berkeley.edu, 2002; pp. 1-9.
Platt, John S., "Fasting Embedding of Sparse Music Similarity Graphs," Microsoft Corporation, {jplatt@microsoft.com}; 2004.
Rauber, Andreas et al., The SOM-enhanced JukeBox: Organization and Visualization of Music Collections Based on Perceptual Models, Journal of New Music Research, vol. 32, Nov. 2, 2003, pp. 193-210.
Rudstrom, Asa , Co-Construction of Hybrid Spaces; A Dissertation submitted to the University of Stockholm in partial fulfillment of the requirements for the Degree of Doctor of Philosophy; Department of Computer and Systems Sciences Stockholm University and, Nov. 2005, 1-69.
Scheible, Jurgen et al., MobiLenin—Combining a Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005.
Scihira, I. "A Characterization of Singular Graphs". Electronic Journal of Linear Algebra, 16:451-462, 2007.
Shneiderman, Ben , Shneiderman, Ben, Tree Visualization with Tree-Maps: 2-d Space-Filling Approach, ACM Transactions on Graphics, vol. 11, No. 1, Jan. 1992, pp. 92-99.
Shneiderman, Ben , Shneiderman, Ben, Treemaps for Space-Contrained.Visualization of Hierarchies, http://www.sc.umd.edu/heil/treemap- history, last updated Apr. 28, 2006, 16 pages.
Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%.Fs1112%2FOBs12.asp.
Strands Business Solutions, "Integration Document v.2.0"; Published May 2008; [online retrieved on Jan. 21, 2010] Retrieved from the internet <URL: http://recommender.strands.com/doc/SBS-Integration-Document.pdf>;entire document-18 pages, May 2008,
Sun, Jimeng et al., Incremental tensor analysis: theory and applications, Jimeng Sun, Dacheng Tao, Spiros Papadimitriou, Philip Yu, Christos Faloutsos, ACM, Oct. 2008, pp. 1-37.
John Thompson, "A Graphic Representation of Interaction With the NEXIS News Database," MIT Thesis (May 1983).
Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 page.
Wolfers, Justin et al., and Zitzewitz, Eric, Prediction Markets, Journal of Economic Perspectives, Spring 2004, pp. 107-126, vol. 18, No. 2., 2004.
Yates, Alexander et al., ShopSmart: Product Recommendations through Technical Specifications and User Reviews; Temple University; CIKM; Oct. 26-30, 2008, Napa Valley, CA, USA; 2 pages, Oct. 2008.
Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009.
Communication Pursuant to Article 94(3) EPC dated Oct. 19, 2009 issued in related European Patent Application No. 08 153 258.2 (5 pages).

\* cited by examiner

METHOD AND ARRANGEMENT FOR PROVIDING CONTENT TO MULTIMEDIA DEVICES

CROSS-REFERENCE TO RELATED APPLICATIONS

This application claims the benefit of U.S. Provisional Patent Application Ser. No. 60/926,006 filed Apr. 24, 2007 and UK Patent Application GB0710853.3 filed Jun. 6, 2007, the entire disclosure of each of which is incorporated by reference herein.

FIELD OF THE INVENTION

The present invention relates generally to a method and arrangement for providing content to multimedia devices, in particular mobile multimedia devices. Content as used herein may be music files, video files, music video files, movies, albums, streaming music, steaming video, video games, applications, pictures, documents, text, figures, ring tones, wall paper, web pages, audio files, information, news, weather information, digital books, audio books, video clips and the like.

The present invention also relates generally to a method and arrangement for arranging sponsorship of delivery of content to users of multimedia devices and in particular to users of mobile multimedia devices.

BACKGROUND INFORMATION

Current mobile multimedia devices are typically capable of receiving multi-media content, such as audio and video content, via a communications network which enables the user to listen to and/or view the received content depending on its form. For example, reception and usage of music files is a highly popular feature which is available for various types of portable mobile devices including the Apple iPod® and other brands of MP3 players, Nokia's N93 smart phone, SonyEricksson's walkman phone and laptop computers. Moreover, fixed multimedia devices having a connection to a communications network are also typically capable of receiving audio and video content which enable a user to listen to and/or view such content.

In addition to enabling reception and usage of music files, many mobile multimedia devices are also capable of receiving video and television files and display the video and television content of such files on a screen thereof.

When using mobile devices, the content is typically delivered to each mobile device using communication networks. Alternatively, the content can be delivered to mobile devices via a personal computer or other device having a connection to the communications network when the mobile devices are connected or linked to the personal computer or other device, or the content can be preloaded into the mobile terminal's memory or can be delivered to the mobile terminal via physical means such as memory cards.

The users of the mobile devices often receive the content, in whatever form, for free. At times however, the users must pay for the content. Typically, when a user pays for the content, there is some kind of Digital Rights Management (DRM) arrangement which protects the rights of the copyright owner of the content. In a typical DRM arrangement, the content is protected and delivered as an encrypted package to the user's mobile device. Rights Object (RO) keys are typically delivered separately to the user's mobile device which allow usage of the content based on business rules set in the RO. Additional details about DRM arrangements and RO keys can be found in various trade specifications, such as one designated Open Mobile Alliance OMA-AD-DRM-V2_0-20050908-C, the entire disclosure of which is incorporated herein by reference.

When users are able to receive the content for free, there are usually advertisements associated with the content. For example, broadcast television and radio networks provide content to users for free and include periodic advertisements.

Another technique to include advertisements when delivering content to users is a concept referred to as mobile marketing and advertising.

At present, mobile marketing and advertising is mostly based on push campaigns to opt-in a consumer mobile number in a database, or pull campaigns that acquire mobile phone numbers from consumers. The most typical example of the pull campaign is the "text-to-win" campaign where, e.g., a soft drink bottle contains a short code to be sent via text message to a certain telephone number. In return, the consumer receives a notification if they have won with the selected marketing message, or a series of messages is broadcast to their mobile phone. Other popular methods of direct advertisement are achieved using text and video messaging.

Regardless of the manner in which an advertisement is delivered to a user of a mobile device, there is always the issue of the delivery cost. The primary components of the delivery cost are the telecommunication transport cost and the cost of the content. Often, an entity might be willing to sponsor the advertisements but the value of the sponsorship is not sufficient to fully cover both the transport cost and the cost for the content.

In view of issues relating to effective mobile marketing and advertising, such as sponsorship issues, advertisers concentrate their advertising campaigns on media which offers a sufficient number of "eye balls" with a single advertisement campaign, e.g., broadcast television.

SUMMARY OF THE INVENTION

The present invention is directed at least in part to a method and arrangement for coordinating sponsorship of content delivered to users, and particularly to the users' mobile multimedia devices. Specifically, content used at different times can be associated with different advertisements so that the cost for sponsoring the same content can be distributed or shared by several advertisers. This is particularly beneficial if the delivery cost of the content, i.e., the transport cost and content cost, is so high such that no single advertiser is willing to sponsor the content for all users. However, it is possible that the cost for sponsoring the same content can be borne by a single advertiser or by a number of advertisers having different advertisements and thus multiple advertising campaigns.

In one embodiment, each time the content is accessed or used by the user, a different advertisement is provided. Thus, in the case of a music file, the user would hear different advertisements from different sponsors, or possibly even the same sponsor, every time (or at some of the times) the music is listened to on the mobile multimedia device. The delivery cost for the content, both its transport and content cost, is therefore obtained or recouped over time.

BRIEF DESCRIPTION OF THE DRAWINGS

The invention, together with further advantages thereof, may best be understood by reference to the following descrip

DETAILED DESCRIPTION

Figure 1:
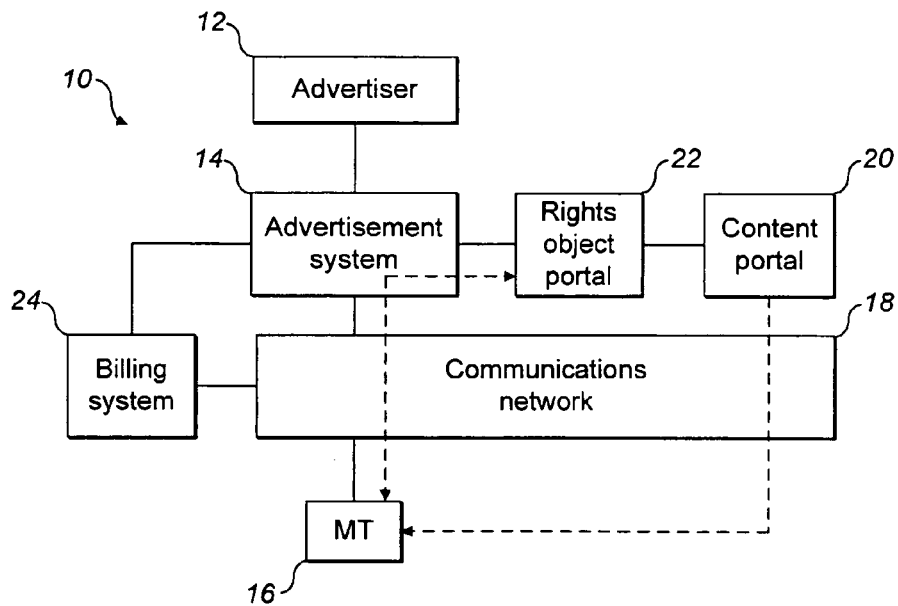
- FIG. 1 is a schematic of an exemplifying architecture of an advertisement sponsorship arrangement in accordance with the invention.

Referring to the accompanying drawings wherein the same reference numerals refer to the same or similar elements, FIG. 1 is a schematic of an advertising sponsorship arrangement in accordance with some embodiments of the invention, designated generally as 10. In the arrangement 10, an advertiser 12 provides advertisements to an advertisement system 14 relating to its products and/or services to be directed to users of a mobile terminal (MT) 16. The advertisement system 14 is arranged to manage advertisement campaigns, and maintain databases containing user profiles such as sex, age, preferences, history information, demographics etc. These databases can be stored in a computer memory associated with or integral with the advertisement system 14 and accessed via computer programs.

Advertisement system 14 is capable of directing the advertisement campaigns to one or more MTs 16 using one or more communications networks 18. The communications network 18 used in embodiments of the invention may be any network which enables delivery of data. Examples of possible communications networks include, but are not limited to, a second Generation (2G) network utilizing Global System for Mobile Communications (GSM), a 2.5 Generation network, a third Generation (3G) network utilizing GSM, Wideband Code Division Multiplex Access (WCDMA), Code Division Multiplex Access (CDMA), or Time Division Multiplex Access (TDMA), a network using Wireless Local Area Networks (WLAN), a broadcast network such as Digital Video Broadcasting for Handheld (DVB-H), a broadcast-over-cellular network, fixed or wireless Internet connections, WiMax or other access technologies. Communications network 18 may be a combination of several types of the above networks, for example, one including WLAN and GPRS connectivity.

Communications network 18 is used to deliver content from a content issue server or portal or content portal 20 to at least one MT 16. The content is associated with a rights object (RO) which is delivered to each MT 16 via a rights object issuer server or rights object portal 22. The RO may be delivered together with or in the context of advertisements delivered from the advertisement system 14.

Optionally, arrangement 10 includes a billing system 24 coupled to the advertisement system 14 and/or the communications network 18 and may be arranged to meter usage of the communications network 18 by each MT 16 and meter usage and payments of or for the content being delivered to each MT 16. The billing system 24 or other suitable means associated with the advertising arrangement 10 can thus arrange for payment from users of the MTs 16 based on their usage of the communications network 18 and their delivered content. The billing system 24 can be also used to arrange billing of the advertisers for content, advertisement and/or DRM object delivery and content costs.

The invention preferably uses a DRM arrangement in which the content may, as is customary, be packaged before delivery to protect it from unauthorized access. The content portal 20 delivers the DRM content, and the rights object portal 22 generates an RO. An RO governs how the DRM content may be used and is often an XML document specifying permissions and constraints associated with a piece of DRM content. DRM content cannot be used without an associated RO, and may only be used according to the permissions and constraints specified in the RO.

The content portal 20 and rights object portal 22 may embody different roles in the arrangement and method in accordance with the invention. Depending on the implementation, they may be provided by the same or different entities, and implemented by the same or different network nodes. For example, in one implementation, content owners may pre-package DRM content, which is then distributed by a content distributor acting as both the content issuer and the rights object issuer.

Open Mobile Alliance DRM enables a separation of DRM content from an RO. DRM content and Rights Objects may be requested separately or together, and they may be delivered separately or at the same time. For example, a user can select a piece of content, pay for it, and receive DRM content and an RO in the same transaction. Later, if the RO expires, the user can go back and acquire a new RO, without having to download the DRM content again.

Figure 2:
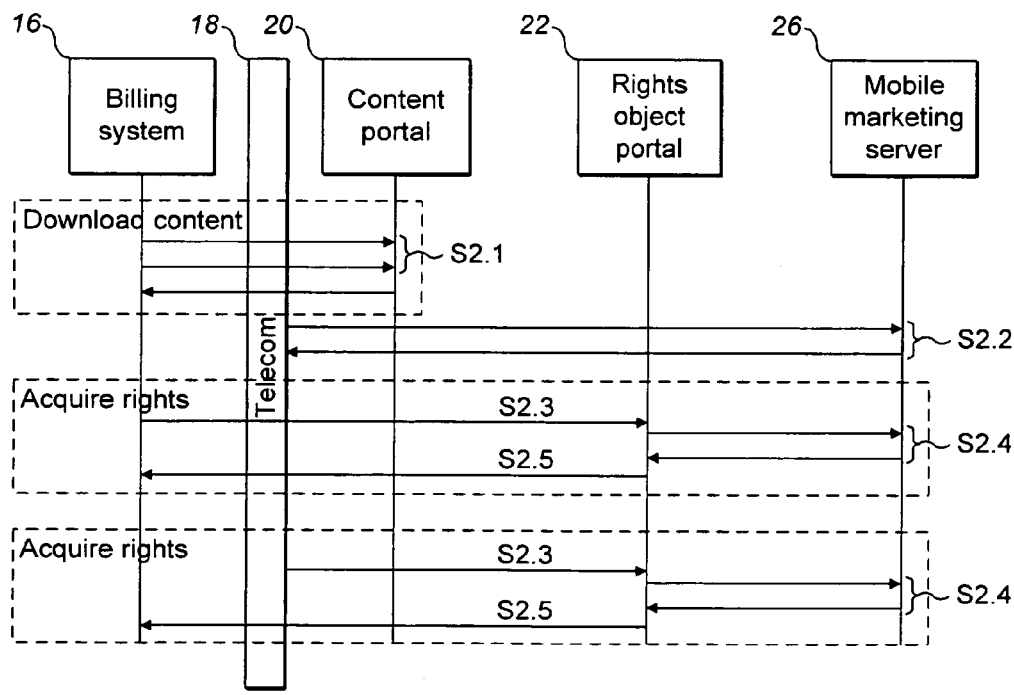
FIG. 2 is a diagram of the manner in which communications flow using the advertisement sponsorship arrangement shown in FIG. 1.

FIG. 2 shows one possible flow of communications using arrangement 10. Initially, a user or owner of the mobile terminal MT 16 accesses the content portal 20, finds content they want to receive and initializes a download of that content from the content portal 20. This download is achieved via a communications infrastructure such as a communications network 18 using cellular connectivity. A mobile marketing server 26, operated or managed by or on behalf of the advertiser or group of advertisers 12, is informed about the requested download via the communications network 18 when the download is determined to be sponsored. Mobile marketing server 26 may constitute part of the advertising system 14 shown in FIG. 1

Determination of whether the content sought to be downloaded is sponsored may be made by a computer program resident at the content portal 20 or elsewhere, such as at the user's MT 16. Such a computer program may be designed to interface with the user of the MT 16 and the content portal 20, and generate a variable output depending on its determination of whether the requested content is sponsored. If the content is not sponsored, the computer program can be designed to provide the requested content, e.g., free to the user or based on satisfaction of certain conditions such as payment from the user. If the content is determined to be sponsored, then the mobile marketing server 26, or other computer operated or managed by the advertiser 12 or an entity which manages advertisements for advertisers, is notified of the need to sponsor the requested content and the possibility of inclusion of an advertisement with an RO which governs use of that content.

As shown in FIG. 2, the content is regulated by a DRM so that even though the user has received the requested download of content from the content portal 20 at their MT 16, they are unable to use it without a RO. Thus, the rights object portal 22 must also be contacted via the communications network 18 when the user initiates a download of the selected content. In the exemplifying embodiment shown in FIG. 2, a new RO is needed from the rights object portal 22 every time the content is used by the user. Each time the user acquires rights from the rights object portal 22, the rights object portal 22 communicates with the mobile marketing server 26, or another entity or server which regulates delivery of RO's for the content downloaded by the user, to verify if it is permissible to deliver the RO. Alternatively, the mobile marketing server 26 can provide permission to the rights objects portal 22 to deliver several, i.e., a predetermined or agreed amount, RO's instead of asking for permission every time. When it is determined by a computer program in the rights object portal 22 and/or mobile marketing server 26 that it is permissible, delivery of the RO from the rights object portal 22 to the user's MT 16 can follow an advertisement obtained from the mobile marketing server 26 or alternatively, the RO can actually be included in the advertisement. Other ways to associate an advertisement with an RO are also envisioned. This procedure to associate an advertisement, obtained from the mobile marketing server 26, with an RO provided by the rights object portal 20, is repeated every time the same content, which has previously been downloaded by the user, is used.

In an alternative embodiment, the mobile marketing server 26 acquires one or more RO's from the rights object portal 22 for the downloaded content and delivers an RO with an associated advertisement to the user when needed, i.e., every time the user wants to use the downloaded content. Thus, RO's are stored on the mobile marketing server 26 and provided therefrom to the user's MT 16.

In an alternative embodiment, the RO can be configured so that it gives the user several usage times for the same content or can be configured in such a way that the RO is valid for a specific time period. After this time period or given number or content usages, the user will need a new RO which is then acquired from the rights objects portal 22 via the mobile marketing server 26.

Figure 3:
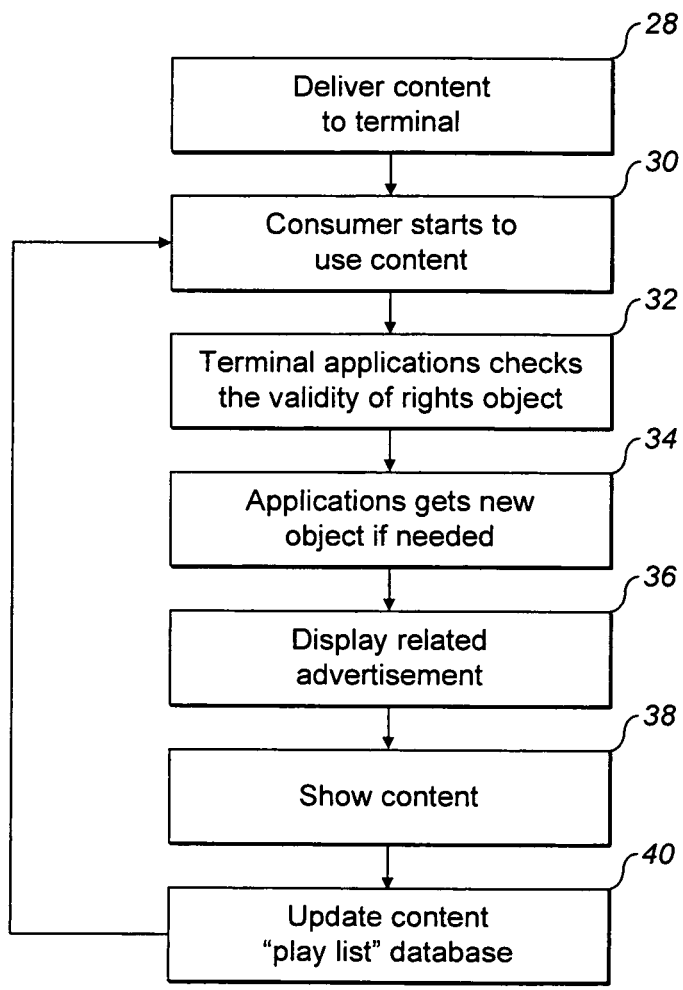
FIG. 3 is a flow chart of the sponsorship arrangement in accordance with the invention from the perspective of a user.

FIG. 3 is a flow chart showing the manner in which a user accesses or uses content in an arrangement and method in accordance with some embodiments of the invention. At 28, content is delivered to the user's mobile terminal, e.g., downloaded in any of the ways described herein. Whenever the user wants to access or use the delivered content in their mobile terminal, at 30, the process of acquiring rights is started. A computer program, which may be resident in the mobile terminal, checks if an RO for the content is available and/or valid or whether a new RO is needed, at 32. If a new RO is needed, the computer program is arranged to initiate a procedure to acquire the RO, at 34, to enable the user to use the content.

As noted above, an advertisement is associated with the RO, i.e., either included in the advertisement or preceding the RO in the transmission to the user's mobile terminal. At 36, this associated advertisement is displayed to the user, for example on a screen of their mobile terminal, or otherwise provided to the user, e.g., if the advertisement is a sound-based advertisement then it would be vocalized through a speaker or headphones on the user's mobile terminal. After the advertisement is displayed, the content is displayed or otherwise made available for use by the user at 38.

At 40, a database is updated to note which advertisement was associated with the content. This database may be resident in the user's mobile terminal or elsewhere, such as at the rights object portal, the advertising system or the mobile marketing server.

In one embodiment, there may be several RO's stored in the user's mobile terminal and several advertisements in the mobile terminal which have been downloaded prior to the user's request to use downloaded content. In one embodiment, the RO's and advertisements can be downloaded in the background when downloading and/or viewing the content. As such, when the user seeks to use content, an RO and associated advertisement are readily available to the user without requiring use of the communications network to obtain an RO. This avoids the need for the user to receive an RO from the rights object portal and an advertisement from the mobile marketing server each and every time that they want to use downloaded content. As such, it avoids problems with transmission delays when accessing the rights object portal and the mobile marketing server.

In an exemplifying embodiment of the invention, an RO can be created by the rights object portal and delivered to the user's mobile terminal which allows usage of the content for several times with the same RO. The advertisement associated with such an RO can be the same or can be varied every time the content is used. This eliminates transmission delays when accessing the rights object portal to obtain a new RO.

Figures 4, 5:
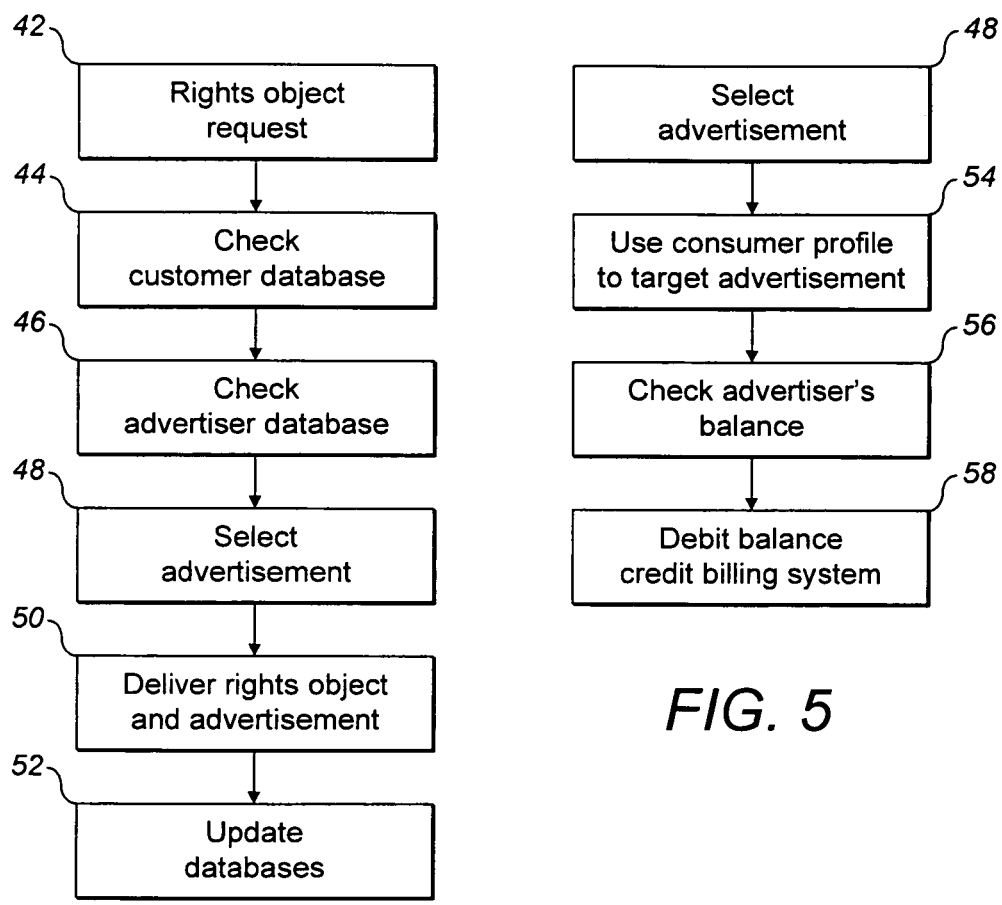
FIGS. 4 and 5 are flow charts of the manner in which advertisements are selected for association with a rights object in accordance with the invention.

FIGS. 4 and 5 are flow charts showing processes for selecting advertisements to be associated with RO's in accordance with some embodiments of the invention. These processes may be implemented by a computer program resident in the advertisement system 14 shown in FIG. 1 or the mobile marketing server 26 shown in FIG. 2. Generally, an advertisement is selected based on business rules in the advertisement system, i.e., parameters set by the advertiser and an advertisement service provider. The computer program can be arranged to provide the advertiser with selectable parameters, such as characteristics of users profiles, and upon selection, the program would cause this advertiser's advertisements to be associated with RO's being delivered only to users have the selected parameter(s).

As shown in FIG. 4, the computer program may be arranged to receive an RO request from the rights object issuer server at 42, check a customer database to obtain a profile or characteristics of the user making the request for an RO at 44, check a database of advertisers for an available advertiser, e.g., one willing to sponsor delivery of the requested content, select an advertisement from a database provided by or on behalf of the advertiser at 48 and then deliver the RO and the selected, associated advertisement to the user at 50. Thereafter, one or more of the database can be updated to reflect the delivery of an RO with the particular advertisement to the user at 52. Updating the database(s) can be designed to ensure that the user receives different advertisements when the use the same content, whether from the same or different advertisers.

As shown in FIG. 5, when selecting an advertisement at 48, an arrangement and method in accordance with some embodiments of the invention can be designed to enable advertisers to target their advertisements to users having specific profiles or characteristics, provided profile or characteristic information about users of the devices is available. To this end, the computer program may be arranged to check a database of advertisers to identify an advertiser who wants to target an advertisement to users having characteristics or a user profile of the user currently requesting an RO, at 54. At 56, the program then checks the advertiser's balance (the advertiser having an advertising account including a cash balance with the advertisement system) to ascertain whether there are sufficient funds to cover a charge for associating the advertisement with an RO, which charge may be set by the entity operating or managing the advertisement delivery or sponsorship arrangement. If so, at 58, a billing system associated with the arrangement debits the advertiser's balance for the charge for delivery of the RO to the user.

Each advertiser's balance may be set as desired and managed by the advertiser's desire to pay for delivery of advertisements to the users. It is foreseen that the advertisers can also be provided with means to manage the advertisements in the databases thereof.

With respect to the charge imposed by the entity operating or managing the advertisement delivery or sponsorship arrangement in accordance with the invention, in an exemplifying embodiment, each charge may only be a portion of the total delivery costs so that the entire delivery cost is spread out or distributed over multiple advertisements (either by different advertisers or the same advertiser). Specifically, the entire delivery cost can be apportioned to a plurality of advertisements which are provided with a respective plurality of RO's which enable the user to use the same downloaded content. In this manner, if the advertisements are provided by different advertisers, no single advertiser is responsible for the entire delivery cost of the content but rather each is responsible for and covers only a portion of the delivery cost. Alternatively, the charge is not required to be directly related to the number of advertisers or the delivery cost and thus, the charges paid by a cumulative amount of sponsors can be larger than the delivery cost.

The portion of the delivery cost each advertiser pays may depend on, for example, the number of advertisements being associated with the RO's and/or the order in which the advertisements are provided. In the latter case, it is conceivable that the advertisement sent with the first RO is apportioned a larger percentage of the total delivery cost than an advertisement sent with a subsequent RO to enable the user to view the same content.

As an example of the manner for apportioning the delivery cost, assuming the entire delivery cost is 2€ and that an advertiser is only willing to pay 0.3€ per exposure of the advertisement to a user, or even more specifically, to a target user. In this regard, an advertiser may be provided with an opportunity to pay one fee per exposure of the advertisement to any user and another, likely higher fee per exposure to a targeted user.

As described above, there is a database of advertisements for association with RO's being provided to users to enable the users to use downloaded content. As the content is delivered to the user's mobile terminal for the first time, a first advertisement is selected from the database and associated with the first RO being directed to the user. Upon receipt of the RO, the user is able to initially use the downloaded content. This generates 0.3€ of revenues. The billing system connected to the advertisement system is arranged to document the delivery of the advertisement to the user and arrange for payment of the 0.3€ from the advertiser who has thus sponsored a portion of the delivery cost of the content.

Every time the user subsequently wants to access or use the same content, the user's mobile terminal is programmed to request a new RO from the rights object portal if the RO is not valid, which has an associated advertisement. The advertiser(s) of each advertisement associated with each new RO is noted by the billing system and payment of 0.3€ for each advertisement is arranged.

In this manner, since each advertisement associated with a respective RO enables use of specific downloaded content requires payment of 0.3€ from the advertiser, the entire delivery cost of 2€ for the content is covered after the user uses the same content for the 7th time (7×0.3€=2.1€>2.0€). Of course, since the delivery cost and the charge for associating an advertisement with an RO may vary, it may require that the user use the downloaded content more or less than seven times to cover the entire delivery cost of the content.

After the entire delivery cost for the content is covered or recouped, the content can be made advertisement-free (i.e., new RO's are provided without any associated advertisements or an RO is provided which allows for unrestricted use of the content) or the arrangement can continue associating advertisements with new RO's every time the content is sought to be used by the user. In the latter case, a residual stream of advertising revenue is obtained.

The advertisement delivery and sponsorship arrangement can be arranged to vary the price of each advertisement being associated with an RO based on the viewing or usage time of the content. For example, the price can be higher for the first time the user uses the content since it is likely that the content, once downloaded, will be used at least once. The price can also be higher for content which is used several times since this is indicative that the user likes the content and pays attention to it.

Figure 6:
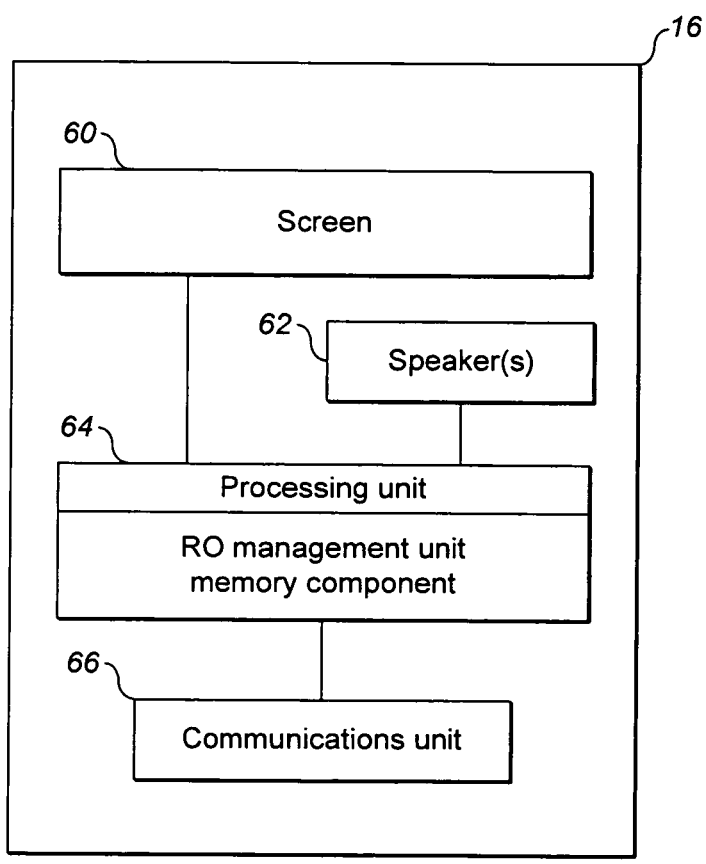
FIG. 6 is a schematic diagram of an exemplifying mobile terminal for use in the invention.

Referring now to FIG. 6, the mobile terminal 16 in accordance with the invention can be any type of known device which interacts with its user, whether by displaying picture or video files via a screen 60 with possible audio output via one or more speakers 62 or by playing audio files via one or more speakers 62. Mobile terminal 16, to be capable of the above-described uses in the invention, would include a processing unit 64 coupled to the screen 60 and speaker(s) 62, and a communications unit 66 arranged to receive content in a form requiring a rights object (RO) to enable use thereof and receive an RO having an associated advertisement. Instead of the screen 60 and speaker(s) 62, another form of a content-play unit arranged to provide the content to a user of the device in an audio form and/or video form can be provided.

The processing unit 64 of the mobile terminal 16 may also include electronic circuitry, e.g., hardware and/or software, which serves as an RO management unit arranged to check the presence and validity of an RO in the mobile terminal 16 and direct the communications unit 66 to request a new RO if there are no valid RO's in the mobile terminal 16. A memory component can also be included in or connected to the processing unit 64 of the mobile terminal 16 and connected to the RO management unit and store RO's and content. When the communications unit 66 is arranged to access a content portal to enable content to be requested, the RO management unit of the processing unit 64 can be arranged to determine whether requested content requires an RO and if so, direct the communications unit 66 to request a new RO or a plurality of RO's. Instead of a communications unit, content-play unit and RO management unit, other electronic componentry can be used, whether implemented as hardware alone, software alone or a combination of both hardware and software.

The foregoing enables innovate mobile marketing and advertising. This is important because such a concept is considered by advertisers as the next new channel to directly reach consumers since it utilizes core assets and characteristics of the mobile media, namely, it is personal in that it is directed solely to individual consumers, it is "always on" and can reach the consumers whenever they access their communications devices, it is mobile and naturally forms groups of people who communicate actively with each other. These characteristics combined with social networks-based approaches of the Internet could form a very powerful base to execute marketing strategies.

In general, mobile marketing and advertising can be divided into the following four categories: mobile marketing, mobile advertising, mobile direct marketing and mobile customer relation management (CRM). The present invention in any of its forms discussed above is applicable to all categories.

Mobile marketing is commonly considered as the systematic planning, implementing and control of a mix of business activities intended to bring together buyers and sellers for the mutually advantageous exchange or transfer of products or services where the primary point of contact with the consumer is via their mobile device.

Mobile advertising is commonly considered as the paid, public, non-personal announcement of a persuasive message by an identified sponsor as well as the non-personal presentation or promotion by a firm of its products to its existing and potential customers where such communication is delivered to a mobile phone or other mobile device. Examples of mobile advertising include: Wireless Application Protocol (WAP) Banner ads, mobile search advertising, mobile video bumpers, and interstitial ads in or on device portals.

Mobile direct marketing is commonly considered a sales and promotion technique in which promotional materials are delivered individually to potential customers via the potential customer's mobile phone or other mobile device. Examples of mobile direct marketing include the sending of Short Message Service (SMS), Multimedia Message Service (MMS) or Wireless Application Protocol (WAP) push messages, Bluetooth messaging and other marketing to mobile phones or other mobile devices.

Mobile customer relation management is commonly considered as a combination of all the foregoing in a manner that establishes a long-term, engaging relationship between the customer and the marketing or promoting company.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

Figure 7A:
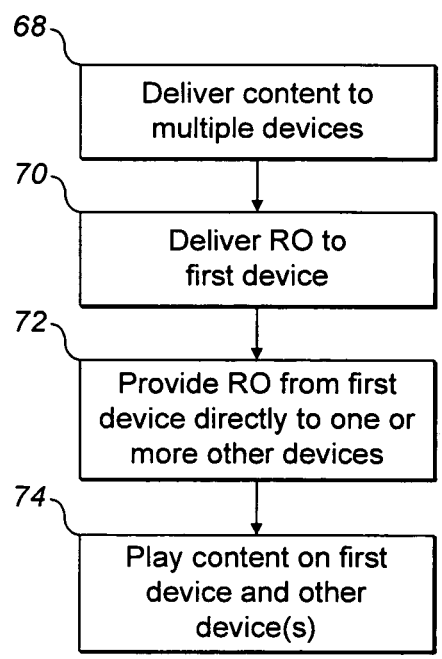
FIGS. 7A, 7B and 7C are flow charts showing techniques for super distribution of content, rights objects and/or associated advertisements in accordance with the invention.
Figure 7B:
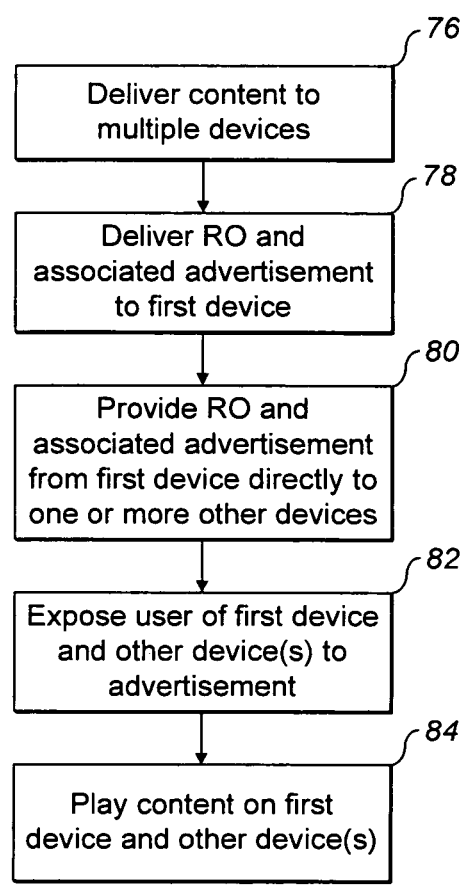
Figure 7C:
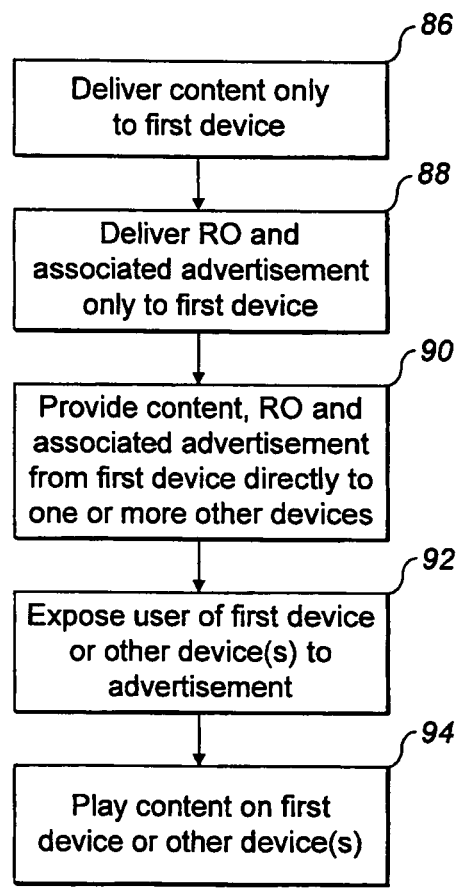

Referring now to FIGS. 7A, 7B and 7C, the invention can also utilize a DRM arrangement wherein users can distribute the content directly to other users without using any specific communication network. This is referred to as super distribution. Thus, in one embodiment of the invention, content, RO's and related advertisements can be obtained by one mobile terminal and thereafter distributed from that mobile terminal to another mobile terminal enabling a super distribution type of arrangement.

As shown in FIG. 7A, one embodiment of such a method includes delivering the same content to the devices in a form requiring a RO to enable use thereof 68, delivering the RO to a first device 70, using for example any of the techniques described above, and enabling the first device to communicate with one or more other devices without use of a communications network to provide each of those devices with the RO for the content 72. The first device and the other devices that received the content and RO can thus play the content 74.

With reference to FIG. 7B, applying an advertising sponsorship technique described above, the content is delivered to the devices 76 and an advertisement is associated with each RO and the RO with associated advertisement is delivered to the first device 78. The first device directly communicates with the other devices and provides the RO and associated advertisement 80. As such, when the user of any device uses the content, the user is exposed to the advertisement 82 that came with the RO for that content and thereafter can play the content 84.

For this type of arrangement, the content is not required to be delivered to each of the users in the manner described above, e.g., directly from a content portal. Rather, as shown in FIG. 7C, it is possible that only the user of the first device receives the content 86 and an RO and associated advertisement 88. The first device directly communicates with the other devices and provides the content, RO and associated advertisement 90. As such, when the user of any device uses the content, the user is exposed to the advertisement 92 that came with the RO for that content and thereafter can play the content 94.

The method provides an efficient way to distribute advertisements without use of a communications network but rather relying on direct communications between user's devices.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims. For example, while the present application is discussed above in connection with mobile multimedia devices, it is not intended to be limited to such devices and is equally applicable to any multimedia device capable of communicating over the internet, a telephone network, or any communications network. For example, in addition to downloading the content from one or more dedicated content portals, the content can be delivered from several servers and peer-to-peer type networks. In addition, in connection with the super distribution type of arrangement, while it is described that the same content is provided to the first device and the one or more devices, it is foreseen that different content can be provided to the first device and the one or more devices. In this situation, the RO is of a more general type (e.g. for all songs of a particular music group as opposed to a specific song by that music group) which would enable different users to access different content (different songs by the same musical group) with the same RO. Further, it is also foreseen that each of the content and advertisement provided to the one or more other devices may be delivered from the first device or from the content portal, or other source. It is also foreseen that the advertisement may be delivered to the device with the content, with the RO, or separately from the delivery of the content and RO, but the advertisement is preferably associated with at least one of the content and the RO being delivered to the device.

The invention claimed is:

1. A method comprising:
   delivering content to a first device, wherein the content requires a rights object (RO) to enable performance thereof and performance of the content is associated with a delivery cost charged to a user of the first device;

attaching an advertisement to the RO upon a determination that the delivery cost has not been entirely satisfied, wherein the advertisement is associated to an advertising cost charged to an advertiser;

delivering the RO and attached advertisement to the first device, wherein the RO enables performance of the content only after performing the attached advertisement; and debiting the advertising cost charged to the advertiser towards the remaining delivery cost charged to the user of the first device upon a determination that the advertisement attached to the RO has been performed.

2. The method of claim 1, further comprising:
delivering the RO to the first device without an attached advertisement upon a determination that the delivery cost has been entirely satisfied.

3. The method of claim 1, further comprising:
delivering multiple ROs, each attached to a different advertisement, to the first device, wherein, while the delivery cost has not been entirely satisfied, a different RO is selected each time the content is to be performed by the first device, each RO requiring performance of the attached advertisement prior to enabling performance of the content.

4. The method of claim 1, wherein the advertisement cost varies based upon the number of times the content has been previously performed by the first device.

5. The method of claim 1, further comprising:
delivering content to at least one other device, wherein the content requires a rights object (RO) to enable performance thereof and performance of the content is associated with a delivery cost to the user of the first device; and enabling the first device to communicate with at least one other device to provide the at least one other device with the RO.

6. The method of claim 1, further comprising:
obtaining profile characteristic information about the users of the devices; and enabling advertisers to target their advertisements to users having specific profiles or characteristics.

7. The method of claim 1, further comprising:
maintaining a balance set by each advertiser to pay for the advertising cost associated with the advertisements delivered to the devices; and prior to attaching an advertisement from an advertiser to an RO, determining whether the advertiser has available funds and only if so, attaching an advertisement from that advertiser with an RO and then debiting a charge for delivery of the advertisement from the advertiser's balance.

8. The method of claim 1, wherein a single RO is delivered to the user each time a request is made to use the content such that each time the user wants to use the same content, they require delivery of a new RO.

9. The method of claim 1, further comprising:
metering usage of a communications network used to deliver the content and RO;

metering usage for content being delivered to each device; and arranging for payment from users based on their usage of the communications network and their delivered content.

10. The method of claim 1, wherein the RO is delivered separate from the content.

11. The method of claim 1, wherein the step of delivering content comprises enabling the user to access a content portal which provides access to different content and select which content the user wants to have delivered.

12. The method of claim 11, further comprising:
notifying a mobile marketing server after the user has selected content to be delivered if the content is determined to be sponsored;

obtaining the advertisement from the mobile marketing server; and then generating an RO having the obtained advertisement attached therewith and delivering this RO and associated advertisement to the device.

13. The method of claim 12, further comprising:
providing information about the user to the mobile marketing server; and determining which advertisement to associate with the RO based on the information about the user.

14. The method of claim 1, further comprising:
forming a database containing which advertisements have been delivered to the users; and using the database to determine which advertisements to direct to each user.

15. A system comprising:
a processor; and
a memory containing instructions that, when executed, cause the processor to:

deliver content to a first device, wherein the content requires a rights object (RO) to enable performance thereof and performance of the content is associated with a delivery cost charged to a user of the first device;

attach an advertisement to the RO upon a determination that the delivery cost has not been entirely satisfied and deliver the RO and attached advertisement to the first device, wherein the RO enables performance of the content only after performing the attached advertisement and the advertisement is associated to an advertising cost charged to an advertiser; and debit the advertising cost charged to the advertiser towards the remaining delivery cost charged to the user of the first device upon a determination that the advertisement attached to the RO has been performed.

16. The system of claim 15, wherein the instructions further cause the processor to:
deliver the RO to the first device without an attached advertisement upon a determination that the delivery cost has been entirely satisfied.

17. The system of claim 15, wherein the instructions further cause the processor to:
deliver multiple ROs, each attached to a different advertisement, to the first device, wherein, while the performance cost has not been entirely satisfied, a different RO is selected each time the content is to be performed by the first device, each RO requiring performance of the attached advertisement prior to enabling performance of the content.

18. The system of claim 15, wherein the advertisement cost varies based upon the number of times the content has been previously performed by the first device.

19. The system of claim 15, wherein the instructions further cause the processor to:
deliver content to at least one other device, wherein the content requires a rights object (RO) to enable performance thereof and performance of the content is associated with a delivery cost to the user of the first device; and enable the first device to communicate with at least one other device to provide the at least one other device with the RO.

20. The system of claim 15, wherein the instructions further cause the processor to:
 obtain profile characteristic information about the users of the devices; and
 enable advertisers to target their advertisements to users having specific profiles or characteristics.

21. The system of claim 15, wherein the instructions further cause the processor to:
 maintain a balance set by each advertiser to pay for the advertising cost associated with the advertisements delivered to the devices; and
 prior to attaching an advertisement from an advertiser to an RO, determine whether the advertiser has available funds and only if so, attaching an advertisement from that advertiser with an RO and then debiting a charge for delivery of the advertisement from the advertiser's balance.

22. The system of claim 15, wherein a single RO is delivered to the user each time a request is made to use the content such that each time the user wants to use the same content, they require delivery of a new RO.

23. The system of claim 15, wherein the instructions further cause the processor to:
 meter usage of a communications network used to deliver the content and RO;
 meter usage for content being delivered to each device; and
 arrange for payment from users based on their usage of the communications network and their delivered content.

24. The system of claim 15, wherein the RO is delivered separate from the content.

25. The system of claim 15, wherein when the processor delivers content by enabling the user to access a content portal which provides access to different content and select which content the user wants to have delivered.

26. The system of claim 25, wherein the instructions further cause the processor to:
 notify a mobile marketing server after the user has selected content to be delivered if the content is determined to be sponsored;
 obtain the advertisement from the mobile marketing server; and then generate an RO having the obtained advertisement attached therewith and delivering this RO and associated advertisement to the device.

27. The system of claim 26, wherein the instructions further cause the processor to:
 provide information about the user to the mobile marketing server; and
 determine which advertisement to associate with the RO based on the information about the user.

28. The system of claim 15, wherein the instructions further cause the processor to:
 form a database containing which advertisements have been delivered to the users; and
 use the database to determine which advertisements to direct to each user.

29. A non-transitory, computer-readable storage medium storing instructions which, when executed by a computing device, cause the computing device to perform the instructions comprising:
 delivering content to a first device, wherein the content requires a rights object (RO) to enable performance thereof and performance of the content is associated with a delivery cost charged to a user of the first device;
 attaching an advertisement to the RO upon a determination that the delivery cost has not been entirely satisfied, wherein the advertisement is associated to an advertising cost charged to an advertiser;
 delivering the RO and attached advertisement to the first device, wherein the RO enables performance of the content only after performing the attached advertisement; and
 debiting the advertising cost charged to the advertiser towards the remaining delivery cost charged to the user of the first device upon a determination that the advertisement attached to the RO has been performed.

30. The non-transitory computer-readable storage medium of claim 29, the instructions further comprising:
 delivering the RO to the first device without an attached advertisement upon a determination that the delivery cost has been entirely satisfied.

31. The non-transitory computer-readable storage medium of claim 29, the instructions further comprising:
 delivering multiple ROs, each attached to a different advertisement, to the first device, wherein, while the delivery cost has not been entirely satisfied, a different RO is selected each time the content is to be performed by the first device, each RO requiring performance of the attached advertisement prior to enabling performance of the content.

32. The non-transitory computer-readable storage medium of claim 29, wherein the advertisement cost varies based upon the number of times the content has been previously performed by the first device.

33. The non-transitory computer-readable storage medium of claim 29, the instructions further comprising:
 delivering content to at least one other device, wherein the content requires a rights object (RO) to enable performance thereof and performance of the content is associated with a delivery cost to the user of the first device; and
 enabling the first device to communicate with at least one other device to provide the at least one other device with the RO.

34. The non-transitory computer-readable storage medium of claim 29, the instructions further comprising:
 obtaining profile characteristic information about the users of the devices; and
 enabling advertisers to target their advertisements to users having specific profiles or characteristics.

35. The non-transitory computer-readable storage medium of claim 29, the instructions further comprising:
 maintaining a balance set by each advertiser to pay for the advertising cost associated with the advertisements delivered to the devices; and
 prior to attaching an advertisement from an advertiser to an RO, determining whether the advertiser has available funds and only if so, attaching an advertisement from that advertiser with an RO and then debiting a charge for delivery of the advertisement from the advertiser's balance.

36. The non-transitory computer-readable storage medium of claim 29, wherein a single RO is delivered to the user each time a request is made to use the content such that each time the user wants to use the same content, they require delivery of a new RO.

37. The non-transitory computer-readable storage medium of claim 29, the instructions further comprising:
 metering usage of a communications network used to deliver the content and RO;
 metering usage for content being delivered to each device; and
 arranging for payment from users based on their usage of the communications network and their delivered content.

38. The non-transitory computer-readable storage medium of claim 29, wherein the RO is delivered separate from the content.

39. The non-transitory computer-readable storage medium of claim 29, wherein the step of delivering content comprises enabling the user to access a content portal which provides access to different content and select which content the user wants to have delivered.

40. The non-transitory computer-readable storage medium of claim 39, the instructions further comprising:
   notifying a mobile marketing server after the user has selected content to be delivered if the content is determined to be sponsored;
   obtaining the advertisement from the mobile marketing server; and then
   generating an RO having the obtained advertisement attached therewith and delivering this RO and associated advertisement to the device.

41. The non-transitory computer-readable storage medium of claim 40, the instructions further comprising:
   providing information about the user to the mobile marketing server; and
   determining which advertisement to associate with the RO based on the information about the user.

42. The non-transitory computer-readable storage medium of claim 29, the instructions further comprising:
   forming a database containing which advertisements have been delivered to the users; and
   using the database to determine which advertisements to direct to each user.

\* \* \* \* \*